(12) United States Patent
Vendrow et al.

(10) Patent No.: US 9,736,756 B2
(45) Date of Patent: *Aug. 15, 2017

(54) CENTRALIZED STATUS SERVER FOR CALL MANAGEMENT OF LOCATION-AWARE MOBILE DEVICES

(71) Applicant: RingCentral, Inc., Belmont, CA (US)

(72) Inventors: Vlad Vendrow, Redwood Shores, CA (US); Bruce Young, San Jose, CA (US); Praful Shah, Los Altos Hills, CA (US); Boris Elpiner, Sunnyvale, CA (US); Vladimir Shmunis, South Lake Tahoe, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,410

(22) Filed: Dec. 31, 2015

(65) Prior Publication Data

US 2016/0119853 A1   Apr. 28, 2016

Related U.S. Application Data

(63) Continuation of application No. 13/245,837, filed on Sep. 26, 2011, now Pat. No. 9,258,673, which is a
(Continued)

(51) Int. Cl.
*H04M 3/42* (2006.01)
*H04W 40/20* (2009.01)
(Continued)

(52) U.S. Cl.
CPC ............ *H04W 40/20* (2013.01); *H04L 67/18* (2013.01); *H04M 3/42229* (2013.01);
(Continued)

(58) Field of Classification Search
CPC ....... H04W 4/16; H04W 40/02; H04W 40/20; H04W 4/025; H04W 4/22; H04W 4/24;
(Continued)

(56) References Cited

U.S. PATENT DOCUMENTS 5,195,131 A   3/1993   Sano
5,530,740 A   6/1996   Irribarren et al.
(Continued)

FOREIGN PATENT DOCUMENTS

EP   0954193      11/1991
JP   64-054889    3/1989
(Continued)

OTHER PUBLICATIONS

Notification of Reexamination in CN Application No. 200880109068.6, issued on Dec. 25, 2015, 10 pages.
(Continued)

*Primary Examiner* — Fred Casca
(74) *Attorney, Agent, or Firm* — Fish & Richardson P.C.

(57) ABSTRACT

Systems, methods and computer program products for utilizing location information in a virtual private branch exchange (vPBX) system are described. In some implementations, the vPBX system can use the location information to determine an availability status of a user of a mobile device (e.g., out of the office, in the office, at home, busy, and the like). The vPBX system can obtain the geographic coordinates of the mobile device and correlate these coordinates with known coordinates for locations associated with the user (e.g., the user's office, home, or other predefined locations). An inference of the user's availability can then be determined based on the correlation (e.g., whether the user is currently out of the user's office, at the user's home, or at another location). The user's availability can be made avail-
(Continued)

able to other users associated with the vPBX system, and can be used for call management (e.g., routing).

20 Claims, 11 Drawing Sheets

Related U.S. Application Data continuation of application No. 12/626,075, filed on Nov. 25, 2009, now Pat. No. 8,838,082, application No. 14/986,410, which is a continuation of application No. 12/429,116, filed on Apr. 23, 2009, now Pat. No. 8,600,391, application No. 14/988,410, which is a continuation of application No. 12/237,181, filed on Sep. 24, 2008, now Pat. No. 8,670,545.

(60) Provisional application No. 61/118,365, filed on Nov. 26, 2008, provisional application No. 61/117,524, filed on Nov. 24, 2008, provisional application No. 60/995,839, filed on Sep. 28, 2007.

(51) Int. Cl.
  *H04W 4/02* (2009.01)
  *H04L 29/08* (2006.01)
  *H04M 3/54* (2006.01)
  *H04W 8/24* (2009.01)

(52) U.S. Cl.
  CPC ... *H04M 3/42348* (2013.01); *H04M 3/42365* (2013.01); *H04W 4/02* (2013.01); *H04W 4/021* (2013.01); *H04W 4/027* (2013.01); *H04M 3/54* (2013.01); *H04W 8/24* (2013.01)

(58) Field of Classification Search
  CPC ....... H04W 64/00; H04W 4/00; H04W 4/003; H04W 4/023; H04W 4/027; H04W 68/00; H04W 68/02; H04W 72/04; H04W 80/00; H04W 8/04
  USPC .......... 455/445, 414.1, 415, 433, 417, 41.2, 455/426.1, 432.1, 456.2; 370/352, 259, 370/221, 236
  See application file for complete search history.

(56) References Cited

U.S. PATENT DOCUMENTS

| | | |
|---|---|---|
| 5,712,712 A | 1/1998 | Sayward |
| 5,717,742 A | 2/1998 | Hyde-Thomson |
| 5,799,065 A | 8/1998 | Junqua et al. |
| 5,889,845 A | 3/1999 | Staples et al. |
| 5,896,448 A | 4/1999 | Holt |
| 5,987,535 A | 11/1999 | Knodt et al. |
| 6,038,451 A | 3/2000 | Syed et al. |
| 6,041,110 A | 3/2000 | Lautenschlager et al. |
| 6,104,790 A | 8/2000 | Narayanaswami |
| 6,230,024 B1 | 5/2001 | Wang et al. |
| 6,233,448 B1 | 5/2001 | Alperovich et al. |
| 6,377,950 B1 | 4/2002 | Peters et al. |
| 6,442,404 B1 | 8/2002 | Sakajiri |
| 6,542,475 B1 | 4/2003 | Bala et al. |
| 6,584,093 B1 | 6/2003 | Salama et al. |
| 6,587,555 B1 | 7/2003 | Cripe et al. |
| 6,760,324 B1 | 7/2004 | Scott et al. |
| 6,792,085 B1 | 9/2004 | Rigaldies et al. |
| 6,801,341 B1 | 10/2004 | Joffe et al. |
| 6,801,520 B2 | 10/2004 | Philonenko |
| 6,816,483 B1 | 11/2004 | Beckstrom et al. |
| 6,870,910 B1 | 3/2005 | Armstrong et al. |
| 6,879,676 B1 | 4/2005 | Contractor |
| 6,901,139 B2 | 5/2005 | Gonzalez et al. |
| 6,950,507 B1 | 9/2005 | Kaplan |
| 6,967,947 B1 | 11/2005 | Chen et al. |
| 6,987,840 B1 | 1/2006 | Bosik et al. |
| 6,993,360 B2 | 1/2006 | Plahte et al. |
| 6,993,561 B2 | 1/2006 | Lincke et al. |
| 6,999,469 B1 | 2/2006 | Chu et al. |
| 6,999,757 B2 | 2/2006 | Bates et al. |
| 7,006,614 B2 | 2/2006 | Feinberg et al. |
| 7,024,457 B1 | 4/2006 | Newman et al. |
| 7,024,474 B2 | 4/2006 | Clubb et al. |
| 7,031,437 B1 | 4/2006 | Parsons et al. |
| 7,031,447 B2 | 4/2006 | Mani |
| 7,047,525 B2 | 5/2006 | Prunty et al. |
| 7,076,558 B1 | 7/2006 | Dunn |
| 7,110,523 B2 | 9/2006 | Gagle et al. |
| 7,123,608 B1 | 10/2006 | Scott et al. |
| 7,162,020 B1 | 1/2007 | Forte |
| 7,180,638 B1 | 2/2007 | Hou et al. |
| 7,184,527 B1 | 2/2007 | Lin et al. |
| 7,245,913 B1 | 7/2007 | Nguyen et al. |
| 7,254,643 B1 | 8/2007 | Peters et al. |
| 7,274,684 B2 | 9/2007 | Young et al. |
| 7,298,833 B2 | 11/2007 | Klein et al. |
| 7,308,255 B2 | 12/2007 | Loveland |
| 7,324,635 B2 | 1/2008 | Wood et al. |
| 7,333,820 B2 | 2/2008 | Sheha et al. |
| 7,359,368 B1 | 4/2008 | Pearce |
| 7,369,648 B1 | 5/2008 | Chang |
| 7,415,104 B2 * | 8/2008 | Gray .................. H04M 3/4217 379/201.01 |
| 7,426,218 B1 | 9/2008 | Archer et al. |
| 7,640,293 B2 | 12/2009 | Wilson et al. |
| 7,702,669 B2 | 4/2010 | Vendrow et al. |
| 7,734,294 B2 | 6/2010 | Kent et al. |
| 7,822,186 B1 | 10/2010 | Boni |
| 7,929,976 B1 | 4/2011 | Appelman |
| 7,941,130 B2 | 5/2011 | Moton, Jr. et al. |
| 7,970,392 B1 | 6/2011 | Bosik et al. |
| 7,996,036 B1 | 8/2011 | Chen et al. |
| 8,000,454 B1 | 8/2011 | Or-Bach et al. |
| 8,020,486 B2 | 9/2011 | Yamamoto et al. |
| 8,134,727 B1 | 3/2012 | Shmunis et al. |
| 8,213,587 B2 | 7/2012 | Vendrow |
| 8,305,622 B1 | 11/2012 | Shmunis et al. |
| 8,384,942 B1 | 2/2013 | Shmunis et al. |
| 8,548,143 B2 | 10/2013 | Vendrow |
| 8,600,391 B2 | 12/2013 | Vendrow et al. |
| 8,670,545 B2 | 3/2014 | Vendrow |
| 8,693,655 B1 | 4/2014 | Chau et al. |
| 8,838,082 B2 | 9/2014 | Vendrow et al. |
| 9,084,186 B2 | 7/2015 | Vendrow et al. |
| 2002/0064149 A1 | 5/2002 | Elliot et al. |
| 2002/0067714 A1 | 6/2002 | Crain et al. |
| 2002/0080025 A1 | 6/2002 | Beattie |
| 2002/0085701 A1 | 7/2002 | Parsons et al. |
| 2002/0120697 A1 | 8/2002 | Generous et al. |
| 2002/0122547 A1 | 9/2002 | Hinchey et al. |
| 2003/0007625 A1 | 1/2003 | Pines et al. |
| 2003/0008612 A1 | 1/2003 | Andreason |
| 2003/0017860 A1 | 1/2003 | Choi |
| 2003/0095541 A1 | 5/2003 | Chang et al. |
| 2003/0186686 A1 | 10/2003 | Yang et al. |
| 2004/0005042 A1 | 1/2004 | Dhara et al. |
| 2004/0028208 A1 | 2/2004 | Carnazza et al. |
| 2004/0111305 A1 | 6/2004 | Gavan et al. |
| 2004/0120479 A1 | 6/2004 | Creamer et al. |
| 2004/0121814 A1 | 6/2004 | Creamer et al. |
| 2004/0160951 A1 | 8/2004 | Galvin et al. |
| 2004/0176083 A1 | 9/2004 | Shiao et al. |
| 2004/0198332 A1 | 10/2004 | Lundsgaard |
| 2004/0202300 A1 | 10/2004 | Cooper et al. |
| 2004/0203918 A1 | 10/2004 | Moriguchi et al. |
| 2004/0204038 A1 | 10/2004 | Suzuki et al. |
| 2004/0218748 A1 | 11/2004 | Fisher |
| 2004/0229620 A1 | 11/2004 | Zhao et al. |
| 2005/0047373 A1 | 3/2005 | Kojima |
| 2005/0047579 A1 | 3/2005 | Salame |
| 2005/0070310 A1 | 3/2005 | Caspi et al. |
| 2005/0083915 A1 | 4/2005 | Mathew et al. |
| 2005/0088686 A1 | 4/2005 | Tanimoto |

(56) References Cited

U.S. PATENT DOCUMENTS

| | | |
|---|---|---|
| 2005/0117733 A1 | 6/2005 | Widger et al. |
| 2005/0141479 A1 | 6/2005 | Ozugur et al. |
| 2005/0153739 A1 | 7/2005 | Halsell |
| 2005/0180551 A1 | 8/2005 | Meek et al. |
| 2005/0195802 A1 | 9/2005 | Klein et al. |
| 2005/0207556 A1 | 9/2005 | Gonzalez et al. |
| 2006/0008066 A1 | 1/2006 | Starling et al. |
| 2006/0018454 A1 | 1/2006 | Nonaka et al. |
| 2006/0023657 A1 | 2/2006 | Woodson et al. |
| 2006/0030357 A1 | 2/2006 | McConnell et al. |
| 2006/0043164 A1 | 3/2006 | Dowling et al. |
| 2006/0077957 A1 | 4/2006 | Reddy et al. |
| 2006/0085516 A1 | 4/2006 | Farr et al. |
| 2006/0099931 A1 | 5/2006 | Trujilo |
| 2006/0116127 A1 | 6/2006 | Wilhoite et al. |
| 2006/0126806 A1 | 6/2006 | Trandal et al. |
| 2006/0135202 A1 | 6/2006 | Ho et al. |
| 2006/0148490 A1* | 7/2006 | Bates .................... H04W 48/02 455/456.1 |
| 2006/0160566 A1 | 7/2006 | Plahte et al. |
| 2006/0161435 A1 | 7/2006 | Atef et al. |
| 2006/0205393 A1 | 9/2006 | Veen |
| 2006/0205436 A1 | 9/2006 | Liu et al. |
| 2006/0210050 A1 | 9/2006 | Bartfield et al. |
| 2006/0215543 A1 | 9/2006 | Croak et al. |
| 2006/0253895 A1 | 11/2006 | Brandofino et al. |
| 2007/0021098 A1 | 1/2007 | Rhodes et al. |
| 2007/0042789 A1* | 2/2007 | Moton, Jr. .............. H04L 41/12 455/456.1 |
| 2007/0047534 A1 | 3/2007 | Hakusui |
| 2007/0058637 A1 | 3/2007 | Lo |
| 2007/0060137 A1 | 3/2007 | Yeatts et al. |
| 2007/0070976 A1 | 3/2007 | Mussman et al. |
| 2007/0105531 A1 | 5/2007 | Schroeder, Jr. |
| 2007/0111716 A1 | 5/2007 | Leigh et al. |
| 2007/0115498 A1 | 5/2007 | Noel et al. |
| 2007/0115978 A1 | 5/2007 | Kondo |
| 2007/0173237 A1 | 7/2007 | Roundtree |
| 2007/0198677 A1 | 8/2007 | Ozhan et al. |
| 2007/0253545 A1 | 11/2007 | Chatterjee et al. |
| 2007/0266077 A1 | 11/2007 | Wengrovitz |
| 2007/0298771 A1 | 12/2007 | Mottes |
| 2008/0002820 A1 | 1/2008 | Shtiegman et al. |
| 2008/0032689 A1 | 2/2008 | Kubota et al. |
| 2008/0032704 A1 | 2/2008 | O'Neil et al. |
| 2008/0032716 A1 | 2/2008 | Forte |
| 2008/0037763 A1 | 2/2008 | Shaffer |
| 2008/0043976 A1 | 2/2008 | Maximo et al. |
| 2008/0056234 A1 | 3/2008 | Sprague |
| 2008/0075261 A1 | 3/2008 | Ramanathan et al. |
| 2008/0118052 A1 | 5/2008 | Houmaidi et al. |
| 2008/0144804 A1 | 6/2008 | Mergen |
| 2008/0186929 A1 | 8/2008 | Rice et al. |
| 2008/0240376 A1 | 10/2008 | Conway et al. |
| 2008/0279362 A1 | 11/2008 | Yasrebi et al. |
| 2008/0298567 A1 | 12/2008 | Guile |
| 2008/0318561 A1 | 12/2008 | Olshansky et al. |
| 2009/0015876 A1 | 1/2009 | Brown |
| 2009/0029724 A1 | 1/2009 | Hardy et al. |
| 2009/0054032 A1 | 2/2009 | Ren et al. |
| 2009/0059818 A1 | 3/2009 | Pickett |
| 2009/0080029 A1 | 3/2009 | Vendrow et al. |
| 2009/0086278 A1 | 4/2009 | Vendrow et al. |
| 2009/0086947 A1 | 4/2009 | Vendrow |
| 2009/0086950 A1 | 4/2009 | Vendrow et al. |
| 2009/0086953 A1 | 4/2009 | Vendrow |
| 2009/0097632 A1 | 4/2009 | Carnazza et al. |
| 2009/0116466 A1 | 5/2009 | Lee et al. |
| 2009/0131080 A1 | 5/2009 | Nadler et al. |
| 2009/0154666 A1 | 6/2009 | Rios et al. |
| 2009/0154678 A1 | 6/2009 | Kewin et al. |
| 2009/0202050 A1 | 8/2009 | Berger et al. |
| 2009/0296907 A1 | 12/2009 | Vendrow et al. |
| 2009/0310598 A1 | 12/2009 | Winbladh et al. |
| 2010/0002626 A1 | 1/2010 | Schmidt et al. |
| 2010/0015995 A1 | 1/2010 | Caspi et al. |
| 2010/0029272 A1 | 2/2010 | McCann et al. |
| 2010/0035594 A1 | 2/2010 | Vendrow et al. |
| 2010/0039676 A1 | 2/2010 | Noel et al. |
| 2010/0039677 A1 | 2/2010 | Noel et al. |
| 2010/0039678 A1 | 2/2010 | Noel et al. |
| 2010/0039679 A1 | 2/2010 | Noel et al. |
| 2010/0046037 A1 | 2/2010 | Noel et al. |
| 2010/0046731 A1 | 2/2010 | Gisby et al. |
| 2010/0080214 A1 | 4/2010 | Li et al. |
| 2010/0081380 A1 | 4/2010 | Lim et al. |
| 2010/0099390 A1 | 4/2010 | Vendrow et al. |
| 2010/0099418 A1 | 4/2010 | Holl et al. |
| 2010/0113013 A1 | 5/2010 | Karabinis et al. |
| 2010/0128291 A1 | 5/2010 | Vendrow et al. |
| 2010/0128861 A1 | 5/2010 | Vendrow et al. |
| 2010/0128862 A1 | 5/2010 | Vendrow |
| 2010/0128867 A1 | 5/2010 | Vendrow et al. |
| 2010/0130172 A1 | 5/2010 | Vendrow et al. |
| 2010/0130213 A1 | 5/2010 | Vendrow et al. |
| 2010/0130228 A1 | 5/2010 | Vendrow et al. |
| 2010/0183134 A1 | 7/2010 | Vendrow et al. |
| 2010/0184408 A1 | 7/2010 | Vendrow et al. |
| 2010/0185584 A1 | 7/2010 | Vendrow et al. |
| 2011/0053643 A1 | 3/2011 | Shmunis |
| 2011/0110511 A1 | 5/2011 | Vendrow et al. |
| 2011/0130168 A1 | 6/2011 | Vendrow et al. |
| 2011/0153668 A1 | 6/2011 | Walker et al. |
| 2011/0177797 A1 | 7/2011 | Vendrow et al. |
| 2011/0191441 A1 | 8/2011 | Herriman et al. |
| 2011/0293083 A1 | 12/2011 | Larson et al. |
| 2012/0021730 A1 | 1/2012 | Vendrow |
| 2012/0021750 A1 | 1/2012 | Vendrow et al. |
| 2013/0016822 A1 | 1/2013 | Vendrow |
| 2013/0057925 A1 | 3/2013 | Shmunis et al. |
| 2014/0162665 A1 | 6/2014 | Vendrow et al. |

FOREIGN PATENT DOCUMENTS

| | | |
|---|---|---|
| JP | 2002-314642 | 10/2002 |
| JP | 2007-006288 | 1/2007 |
| KR | 1020000023675 | 4/2000 |
| KR | 1020010011139 | 2/2001 |
| KR | 1020020086695 | 11/2002 |
| KR | 1020040039569 | 5/2004 |
| KR | 1020050014088 | 2/2005 |
| KR | 1020050000884 | 6/2005 |
| KR | 1020050061255 | 6/2005 |
| KR | 1020050116096 | 12/2005 |
| KR | 1020060096568 | 9/2006 |
| KR | 1020060115833 | 11/2006 |
| KR | 1020070006314 | 1/2007 |
| KR | 10-0815239 | 3/2008 |
| KR | 1020080029682 | 4/2008 |
| KR | 1020090058808 | 6/2009 |
| KR | 1020100065221 | 6/2010 |
| WO | WO 95/11578 | 4/1995 |
| WO | WO 98/23080 | 5/1998 |
| WO | WO 98/27754 | 6/1998 |
| WO | WO 98/34391 | 8/1998 |
| WO | WO 98/47298 | 10/1998 |
| WO | WO 2006/022421 | 3/2006 |
| WO | WO 2006/056983 | 6/2006 |
| WO | WO 2007/025950 | 3/2007 |
| WO | WO 2007/053420 | 5/2007 |
| WO | WO 2008/074122 | 6/2008 |
| WO | WO 2010/059756 | 5/2010 |
| WO | WO 2010/062981 | 6/2010 |

OTHER PUBLICATIONS

Notification of Reexamination in CN Application No. 200880109068.6, issued on Apr. 21, 2016, 10 pages.

"Automated Phone Trees: Two Potential Solutions," [online] Jul. 5, 2009; Retrieved from the Internet: <URL: http://developmentally.wordpress.com/2009/07/05/automated-phone-trees-two-potential-solutions/>; 3 pages.

(56) References Cited

OTHER PUBLICATIONS

"California Inventors Develop Caller Identification Based Call Routing Feature", US Fed News Services, Including US State News, Jan. 29, 2008, pp. 1-2.

"Call Routing Rules," IBM Lotus Sametime Unified Telephony Administrator's Guide, IBM Corp., 2009, p. 177; see also, Call Routing Rules <http://publib.boulder.ibm.com/infocenter/sametime/v8ro/index.jsp?topic=/com.ibm.help.sametime.telephony.doc/sut_adm_monitor_rules_c.html>.

"Remote access RADIUS attributes: Remote Access," Microsoft Technet, Microsoft Corporation, http://technet.microsoft.com/en-us/library/cc728366(WS.10).aspx (last updated Jan. 21, 2005).

Asterisk, I.T., "Asterfax-Asterisk Fax," Aug. 25, 2007 (Aug. 25, 2007), XP002598206. Retrieved from the Internet: <URL: http://web.archive.org/web/2007082533700/http://asterfax.sourceforge.net/index.html[retrieved on Aug. 24, 2010].

Cho, G., et al., "An Efficient Location and Routing Scheme for Mobile Computing Environments", IEEE Journal on Selected Areas in Communications, Jun. 1995, pp. 1-11, vol. 13, Issue 5.

Kaluza, Marcin, "Fax Services: Send Any Printable File from Your Program in Windows 2000" MSDN Magazine, Aug. 31, 2001 (Aug. 31, 2001), XP002598207. Retrieved from the Internet: <URL:http://msdn/microsoft/com/en-us/magazine/cc301661.aspx [retrieved on Jul. 9, 2012], 9 pgs.

Konstantoulakis, G., et al., Call Management Policy Specification for the Asterisk Telephone Private Branch Exchange, IEEE Workshop on Policies for Distributed Systems and Networks (Policy 2007), Jun. 13, 2007, pp. 1-11, Bologna, Italy.

L'Ecuyer, M., et al., "Using Skills-based Routing to Enhance Contact Center Revenue and Performance. (Call Center/CRM Management Scope)," The Free Library (May 1, 2003) http://www.thefreelibrary.com/Using+skills-based+routing+to+enhance+contact+center+revenue+and . . . -a0102137613.

Lam, D., et al., "Modeling Location Management in Personal Communication Services", Oct. 18, 1995, pp. 1-27, IEEE International Conference on Universal Personal Communications, 1996.

Lam, D., et al., "Teletraffic Modeling for Personal Communications Services", IEEE Communications Magazine, Feb. 1997, pp. 1-9, Stanford University.

Maniatis, P., et al., "The Mobile People Architecture", ACM SIGMOBILE, Mobile Computing and Communications Review, vol. 3, Issue 3 (Jul. 1999), pp. 36-42, see also, <http://portal/acm.org/citation.cfm?id=329153>.

Mintz-Habib, M., et al., "A VoIP Emergency Services Architecture and Prototype", Computer Communications and Networks, 2005. ICCCN 2005, "Fourteenth International Conference on Computer Communications and Networks", Issue date Oct. 17-19, 2005, pp. 1-6, Columbia University.

Sripanidkulchai, et al., "Call Routing Management in Enterprise VoIP Networks", INM '07, Aug. 27-31, 2007, ACM SIGCOMM Workshop, pp. 1-6, Kyoto, Japan.

Stokes, S., et al., "A Priority System to Improve Callback Success in Telephone Surveys", Proceedings of the Survey Research Methods Section American Statistical Association, 1990, pp. 742-747, University of Texas at Austin, Austin, Texas.

Wang, H. et al., "ICEBERG: An Internet-core Network Architecture for Integrated Communications", pp. 1-13, IEEE, Personal Communications, vol. 7, Issue 4 (Aug. 2000).

AU Office Action dated Aug. 1, 2012 from Australian Patent Application No. 2008309022, 5 pages.

CN Office Action dated Apr. 23, 2012 from Chinese Patent Application No. 200880109068.6 (with English Translation), 18 pages.

CN Office Action dated Feb. 18, 2013, from Chinese Patent Office No. 200880109068.6 (with English Translation), 8 pages.

CN Office Action dated Sep. 9, 2013, from Chinese Patent Office No. 200880109068.6 (with English Translation), 19 pages.

CN Office Action in Application No. 200880109068.6, mailed Mar. 21, 2014, 12 pages.

CN Office Action in Application No. 200880109068.6, mailed Dec. 4, 2014, 17 pages.

USPTO Final Office Action in U.S. Appl. No. 12/237,181, mailed Jun. 4, 2012, 22 pages.

USPTO Non-Final Office Action in U.S. Appl. No. 12/626,075, mailed Jul. 6, 2012, 16 pages.

USPTO Non-Final Office Action in U.S. Appl. No. 12/237,181, mailed Oct. 26, 2011, 22 pages.

USPTO Office Action in U.S. Appl. No. 12/429,116, mailed Apr. 12, 2012, 11 pages.

USPTO Office Action in U.S. Appl. No. 12/429,116, mailed Sep. 11, 2012, 7 pages.

USPTO Office Action in U.S. Appl. No. 13/245,837, mailed Apr. 4, 2012, 19 pages.

European Search Report in European Application No. 08833690.4-1522/2193655, dated Sep. 9, 2010.

European Search Report in European Patent Application No. 08835856.9-2414/2193654, dated Jan. 30, 2012.

International Initial Publication with ISR in International Application No. PCT/US2008/077683, dated Apr. 9, 2009.

International Preliminary Report on Patentability from International Application No. PCT/US2008/077683, dated Mar. 30, 2010, 8 pages.

International Search Report and Written Opinion in International Application No. PCT/US2008/077683, mailed Dec. 10, 2008, 9 pages.

International Preliminary Report on Patentability as issued in Patent Application PCT/US2009/065969 on Jun. 9, 2011, 6 pages.

International Preliminary Report on Patentability as issued in Patent Application PCT/US2009/065036 on Jun. 3, 2011, 7 pages.

International Search Report and Written Opinion as issued in Patent Application PCT/US2009/065036 on Jul. 9, 2010, 10 pages.

International Preliminary Report on Patentability from International Application No. PCT/US2009/051598, dated Feb. 8, 2011.

International Search Report from International Application No. PCT/US2009/051598, dated Apr. 1, 2010.

International Written Opinion from International Application No. PCT/US2009/051598, dated Feb. 7, 2011.

International Preliminary Report on Patentability from International Application No. PCT/US2009/051751, dated Apr. 26, 2011, 6 pages.

International Search Report and Written Opinion from International Application No. PCT/US2009/051751, dated Mar. 5, 2010, 3 pages.

International Preliminary Report on Patentability from International Application No. PCT/US2009/065055, dated May 24, 2011, 5 pages.

International Search Report from International Application No. PCT/US2009/065055, dated Jul. 7, 2010.

International Written Opinion from International Application No. PCT/US2009/065055, dated May 24, 2011.

International Preliminary Report on Patentability from International Application No. PCT/US2009/065985, dated May 31, 2011, 4 pages.

International Search Report from International Application No. PCT/US2009/065985, dated Jun. 22, 2010.

International Written Opinion from International Application No. PCT/US2009/065985, dated Jun. 18, 2010, 3 pages.

International Preliminary Report on Patentability from International Application No. PCT/US2009/065976, dated May 31, 2011, 5 pages.

International Search Report from International Application No. PCT/US2009/065976, dated Jul. 2, 2010.

International Preliminary Report on Patentability from International Application No. PCT/US2009/065987, dated May 31, 2011.

International Search Report from International Application No. PCT/US2009/065987, dated Jul. 14, 2010.

International Written Opinion from International Application No. PCT/US2009/065987, dated May 25, 2011.

International Preliminary Report on Patentability from International Application No. PCT/US2010/044196, dated Mar. 6, 2012, 5 pages.

International Search Report from International Application No. PCT/US2010/044196, dated May 3, 2011.

(56) References Cited

OTHER PUBLICATIONS

International Written Opinion from International Application No. PCT/US2010/044196, dated Mar. 1, 2012.
International Preliminary Report on Patentability in International Application No. PCT/US2009/065038, dated May 24, 2011.
International Search Report from International Application No. PCT/US2009/065038, dated Jul. 2, 2010.
International Written Opinion from International Application No. PCT/US2009/065038, dated May 24, 2011.
International Preliminary Report on Patentability International Application No. PCT/US2009/051768, dated May 24, 2011.
International Search Report from International Application No. PCT/US2009/051768, dated Jun. 10, 2010.
International Written Opinion from International Application No. PCT/US2009/051768, dated May 25, 2011.
International Search Report and the Written Opinion in International Application No. PCT/US2009/045703, mailed Jul. 29, 2009, 5 pages.
International Search Report and Written Opinion from International Application No. PCT/US2010/058569, dated Aug. 18, 2011, 8 pages.
International Search Report and Written Opinion in Application No. PCT/US2009/065969, dated May 28, 2010.
International Search Report and Written Opinion of in International Application No. PCT/US2008/077546; mailed Dec. 8, 2008; 8 pages.
International Search Report from International Application No. PCT/US2010/052880, dated Jun. 30, 2011.
International Search Report from International Application No. PCT/US2010/022075, dated Jul. 28, 2011.
CN Office Action in Application No. 200880109068.6, mailed Oct. 14, 2015, 10 pages.

\* cited by examiner

| 910 | 920 | 930 | 940 | 950 | 960 | 970 |
|---|---|---|---|---|---|---|
| Lat. | Long. | Alt. | Proximity Distance | Location | Action | Moving Status |
| N33.781702 | -117.583544 | 60 | 20 | Office | Route to desk phone | Stationary |
| N37.410754 | -121.941279 | 50 | 10 | Home | Forward to 650-555-1212 | Stationary |
| ... | | | | | | |

CENTRALIZED STATUS SERVER FOR CALL MANAGEMENT OF LOCATION-AWARE MOBILE DEVICES

CROSS-REFERENCE TO RELATED APPLICATIONS

This application is a continuation application of, and claims priority to, pending U.S. application Ser. No. 13/245,837, filed on Sep. 26, 2011, entitled "Centralized Status Server for Call Management of Location-Aware Mobile Devices," which is a continuation application of U.S. application Ser. No. 12/626,075, filed on Nov. 25, 2009 (now U.S. Pat. No. 8,838,082), entitled "Centralized Status Server for Call Management of Location-Aware Mobile Devices," which claims priority under 35 U.S.C. §119(e) to U.S. Provisional Application No. 61/118,365, filed on Nov. 26, 2008, entitled "Centralized Status Server for Call Management of Location-Aware Mobile Devices." This application is also a continuation of, and claims priority to, U.S. application Ser. No. 12/429,116, filed on Apr. 23, 2009 (now U.S. Pat. No. 8,600,391), entitled "Call Management for Location-Aware Mobile Devices," which claims priority under 35 U.S.C. §119(e) to U.S. Provisional Application No. 61/117,524, filed on Nov. 24, 2008, entitled "Call Management for Location-Aware Mobile Devices." This application is also a continuation of, and claims priority to, U.S. patent application Ser. No. 12/237,181, filed on Sep. 24, 2008 (now U.S. Pat. No. 8,670,545), entitled "Inbound Call Identification and Management," which claims priority under 35 U.S.C. §119(e) to U.S. Provisional Application No. 60/995,839, filed on Sep. 28, 2007, entitled "Inbound Call Identification and Management." The disclosures of each of the foregoing applications are incorporated herein by reference in their entirety.

TECHNICAL FIELD

This subject matter relates to managing calls for mobile devices.

BACKGROUND

A private branch exchange (PBX) is a telephone network that serves a business or an office. A virtual PBX (vPBX) allows a business or office to be served by a PBX system hosted on remote servers. The service is provided through a combined voice network (e.g. telephone network) and data network (e.g. Internet). Conventional vPBX systems are not well suited to routing and controlling calls based on geographic locations of mobile devices that are connected to the vPBX systems.

SUMMARY

A positioning system (e.g., Global Positioning System) integrated in, or coupled to, a mobile device can be used to determine a position of a mobile device. An availability status manager ("ASM") in a vPBX can acquire the position of the mobile device from the positioning system. The ASM can include rules on how to route or otherwise control incoming phone calls based on availability status of one or more mobile devices in the vPBX network. When a call is received by the vPBX, the ASM determines the availability status of the recipient mobile device. Availability status can be based on the geographic location of the recipient mobile device. The ASM can route calls destined for the recipient mobile device, to another mobile device, or to a landline based on the availability status of the mobile device and the rules.

In some implementations, a method can be used that includes receiving geographic information associated with a mobile device; determining a device location of the mobile device based on the geographic information; identifying an availability status of the mobile device based on the device location; and identifying a call-related action rule defining a call-related action based on the availability status.

In some implementations, a device can be used that includes a call control manager that receives one or more calls to be completed to a mobile device and processes the one or more received calls using geographic information associated with the mobile device, the call control manager including: a location manager to identify a location rule based on the geographic information, the location rule relating the geographic information to a predefined location; a device locator to determine a current availability status of the mobile device based on the location rule and the predefined location; and an action mapper to identify an action rule based on the current availability status of the mobile device.

In some implementations, a device can be used that includes a call control manager that receives one or more calls to be completed to a mobile device and processes the one or more received calls using geographic information associated with the mobile device, the call control manager including: a location manager to identify a location rule based on the geographic information, the location rule relating the geographic information to a predefined location; a device locator to determine a current availability status of the mobile device based on the location rule and the predefined location; and an action mapper to identify an action rule based on the current availability status of the mobile device.

The details of one or more implementations for call management of location-aware mobile devices are set forth in the accompanying drawings and the description below. Other features, objects, and advantages of the techniques will be apparent from the description and drawings, and from the claims.

DESCRIPTION OF DRAWINGS

FIG. 9 illustrates an example of a rule database.

Like reference symbols in the various drawings indicate like elements.

DETAILED DESCRIPTION

Some conventional mobile devices include built-in positioning technology (e.g., global position satellite (GPS)

receivers) that allows a given device to identify its geographic location. A vPBX system can use the location information to determine an availability status of the owner of the mobile device (e.g., out of the office, in the office, at home, busy, and the like). For example, the vPBX system can obtain the geographic coordinates of a mobile device and correlate these coordinates with known coordinates for locations associated with the user (e.g., the user's office, home, or other predefined locations). An inference of the user's availability can be determined based on the correlation (e.g., whether the user is currently out of the user's office, at the user's home, or at another location). The user's availability can be made available to other users associated with the vPBX system, and can be used for call management (e.g., routing) as will be discussed in greater detail below.

Call Management System Overview

Figure 1:
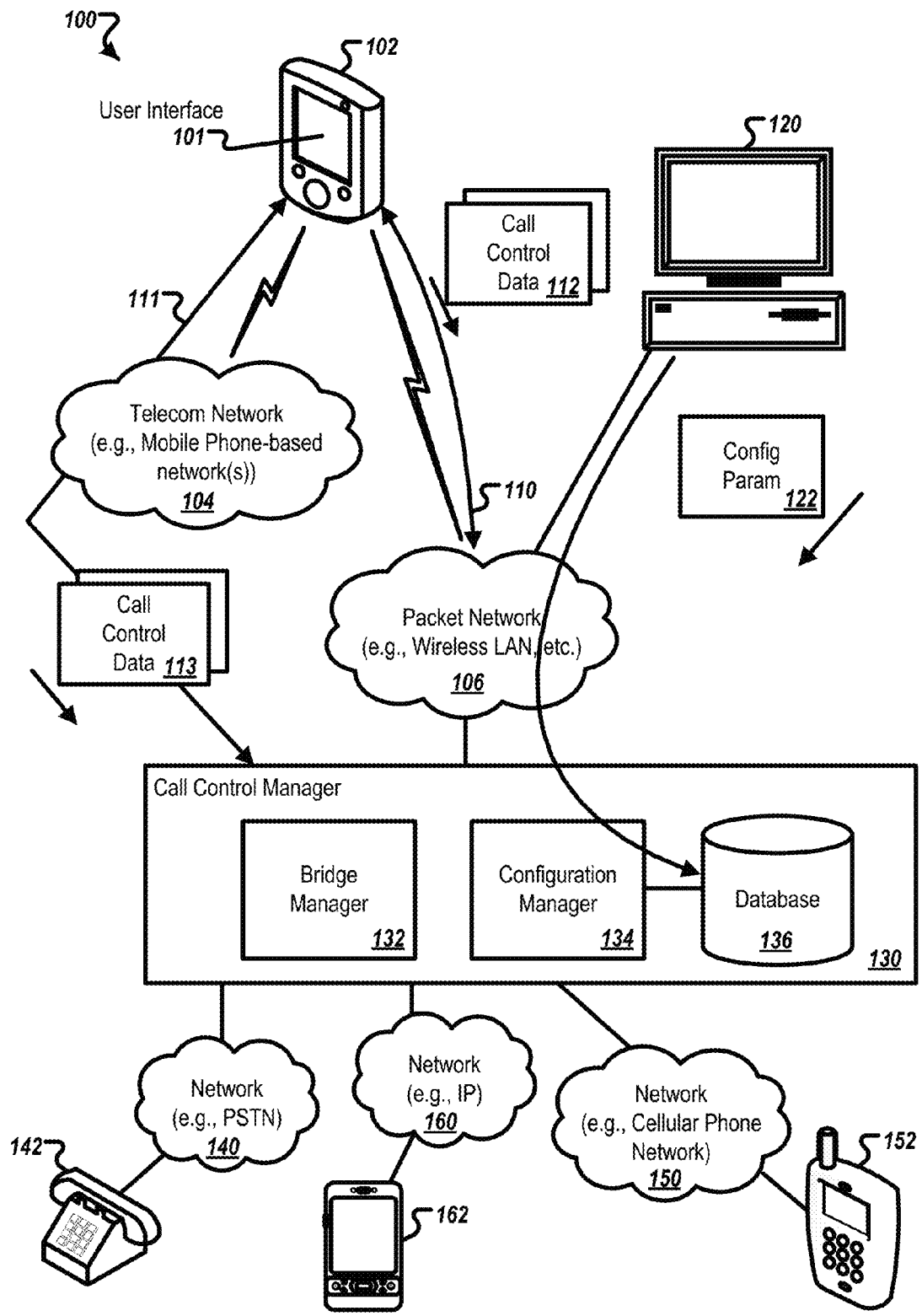
FIG. 1 shows an example of a call management system.

FIG. 1 shows an example of a call management system 100. A mobile device 102 can be connected to a telecom network 104 and a packet network 106. The mobile device 102 can be configured to communicate with devices connected to the telecom network 104 and the packet network 106 using multiple modes of communication (i.e., "multimodal channels of communication").

In some implementations, the telecom network 104 and the packet network 106 can each operate in a same or different mode of communication. For example, the telecom network 104 can operate in accordance with a first mode of communication. Examples of the first mode of communication can include Public Switched Telephone Network ("PSTN") phone modes, cellular/wireless telephone technology modes, such as Global System for Mobile communications ("GSM"), Frequency Division Multiple Access ("FDMA"), Time Division Multiple Access ("TDMA"), Code Division Multiple Access ("CDMA"), and the like.

The packet network 106 can operate in accordance with a second mode of communication. Examples of the second mode of communication include Voice over Interner Protocol (VOIP) modes, wireless LAN modes (e.g., telephone technologies/standards, such as WiMAX and any other IEEE 802.xx-based modes), and the like. Any number of modes is possible.

A call manager 130 can be coupled to the mobile device 102 through the telecom network 104 or the packet network 106. For example, the mobile device 102 can be configured to interact with the call control manager 130 over a call control communications channel. In some implementations, the call communications channel can include a broadband call control channel 110, and the broadband call control channel 110 can be established with the packet network 106 (e.g., in the same or separate channel used to convey voice/video data, such as in a Session Initiation Protocol ("SIP") message).

In some implementations, the call communications channel also can include a narrowband call control channel 111, and the narrowband call control channel 111 can be established with the telecom network 104 (e.g., a mobile operator can be provided in the same or separate channel used to convey voice/video data, such as in an Short Message Service ("SMS") message). The mobile device 102 and/or the call control manager 130 can be configured to transmit and/or receive call control data 113 and call control data 112 over the narrowband call control channel 111 and over the broadband call control channel 110, respectively. The call control manager 130 can be configured to effect a number of call controlling functions that can be performed remotely from the mobile device 102. For example, the call control manager 130 can execute call control operations in association with a first call from a communications device 142 via a PSTN network 140, a second call from a communications device 152 via an internet protocol (IP) network 150, and/or a third call from a communications device 162 via a cellular phone network 160.

In some implementations, the call control manager 130 can be disposed in a central office ("CO"). In some implementations, the mobile device 102 can include an interface 101 (e.g., a user interface) for facilitating the generation, receipt, processing, and management of the call control data 112 and 113 for delivery over the narrowband call control channel 111 and/or the broadband call control channel 110. The interface 101 can be configured to implement the various functionalities, including receiving inbound calls, dialing outbound calls, click-to-call generating a combined inbound and outbound call, and the like.

In some implementations, the call control manager 130 can include a bridge manager 204, a configuration manager 134, and a repository database ("DB") 136. Bridge manager 204 can be configured to perform, without limitation, inbound call delivery, call routing, call transfer functions, and conference call functions for the mobile device 102. For example, an inbound missed call can be recorded (e.g., voice mail) on the mobile device 102 and/or on the call control manager 130 and simultaneously reviewed on the mobile device 102 using the interface 101. During call recording, the call manager 130 can allow the inbound call to be answered dynamically at the mobile device 102 and/or transferred to one of the communications devices 142, 152, and 162. Completed recordings (e.g., announcements, voice mail, etc.) can be reviewed at the mobile device 102 using the interface 101.

The configuration manager 134 can be configured to interact with a remote computing device 120 or with the mobile device 102 to receive configuration parameter data ("conf param") 122. The configuration manager 134 can store the configuration parameter data 122, and responsive to such data, the call control manager 130 can control inbound calls before, during, or after reaching the mobile device 102. The configuration manager 134 also can be configured to store (e.g., in the database 136) audio files recorded through the interface 101 on the mobile device 102, and transmit the stored files to the mobile device 102 using the narrowband call control channel 111 and/or the broadband call control channel 110.

Call Manager

Figure 2:
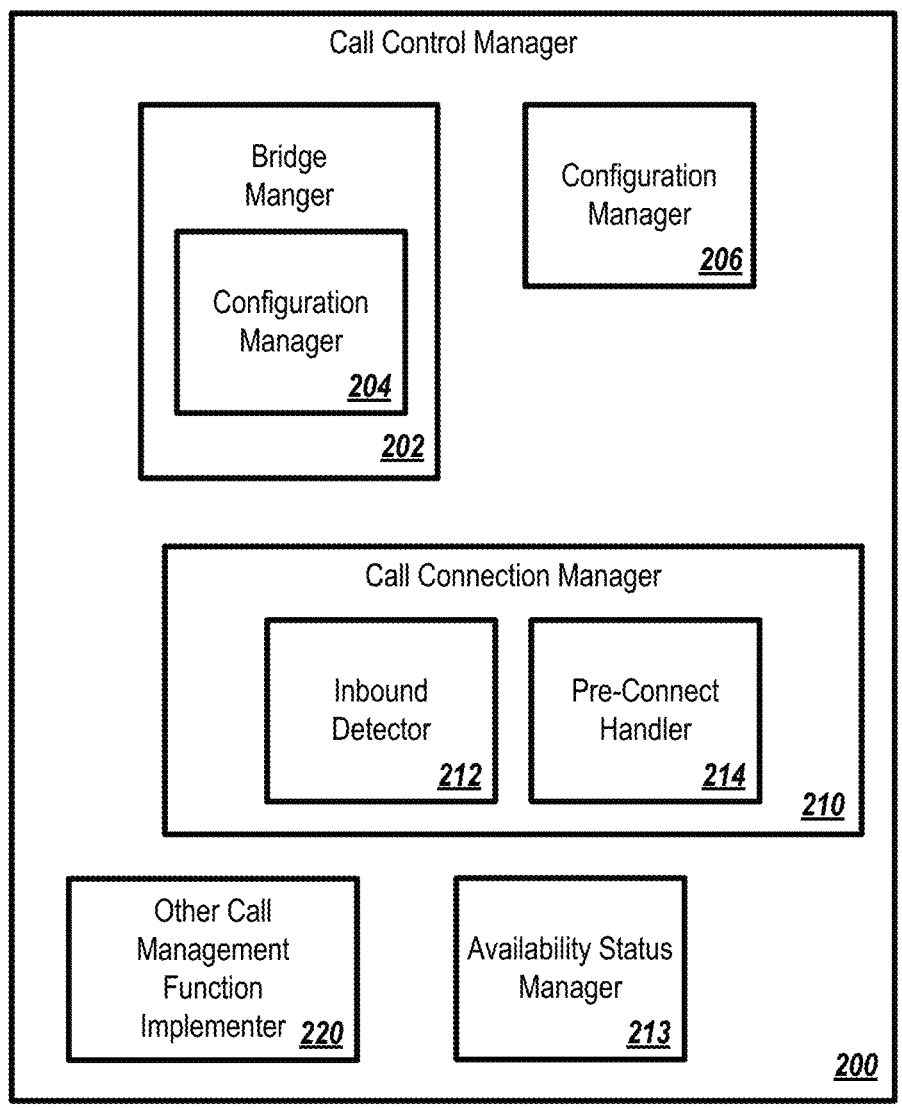
FIG. 2 shows an example of a call control manager.

FIG. 2 shows an example of a call control manager 130. Call control manager 130 can include a bridge manager 132, a configuration manager 134, a call connection manager 210, an available status manager 213, and a call management engine 220 configured to implement any call control function described herein.

Bridge manager 132 can include a call mixer 204. In some implementations, the call mixer 204 can be configured to combine calls using various telecommunication technologies and protocols. Call mixer 204 can use different CODECs to implement the various telecommunication technologies and protocols. In some implementations, mixer 204 can reside in the mobile device 102. In some implementations, mixer 204 can be external to the mobile device 102.

Call connection manager 210 can include an inbound detector 212 and a pre-connect handler 214. Inbound detector 212 can detect a call from any communications device (e.g., communications devices 142/152/162 shown in FIG. 1) and determine whether a communication link to the mobile device 102 (e.g., using the packet network 106 of FIG. 1) can be established. For example, inbound detector 212 can communicate with the mobile device 102 to determine whether a data rate of more than, for example, 8 kb/sec is obtainable. If the specified data rate is not practicable, the inbound detector 212 can determine an appropriate course of action (e.g., directing the call to the user's voicemail) until the specified data rate is above an acceptable threshold.

In some implementations, call control data 112 can contain one or more call-related (or non-call related) instructions related to handing one or more calls from the communications devices 142/152/162. In some implementations, pre-connect handler 214 can interact with the mobile device 102 to receive these instructions before establishing a connection with the communications devices 142/152/162.

Similarly, call control data 113 can contain one or more call-related (or non-call related) instructions related to handing one or more calls from the communications devices 142/152/162. In some implementations, the call control data 113 can be incorporated into an SMS message (or any other type of messaging protocol) that can be sent to the control manager 130 using the telecom network 104. For example, the mobile device 102 can generate the call control data 113, and the call control data 113 can include an instruction that instructs the call control manager 130 to transmit a message to the communications devices 142/152/162. An example of such a message can include, for example, "I am out of wireless LAN range. I will call you later when I can make a VOIP call." Components of the call control manager 130 can be implemented in hardware or software, or a combination thereof.

Mobile Device Implementation

Figure 3:
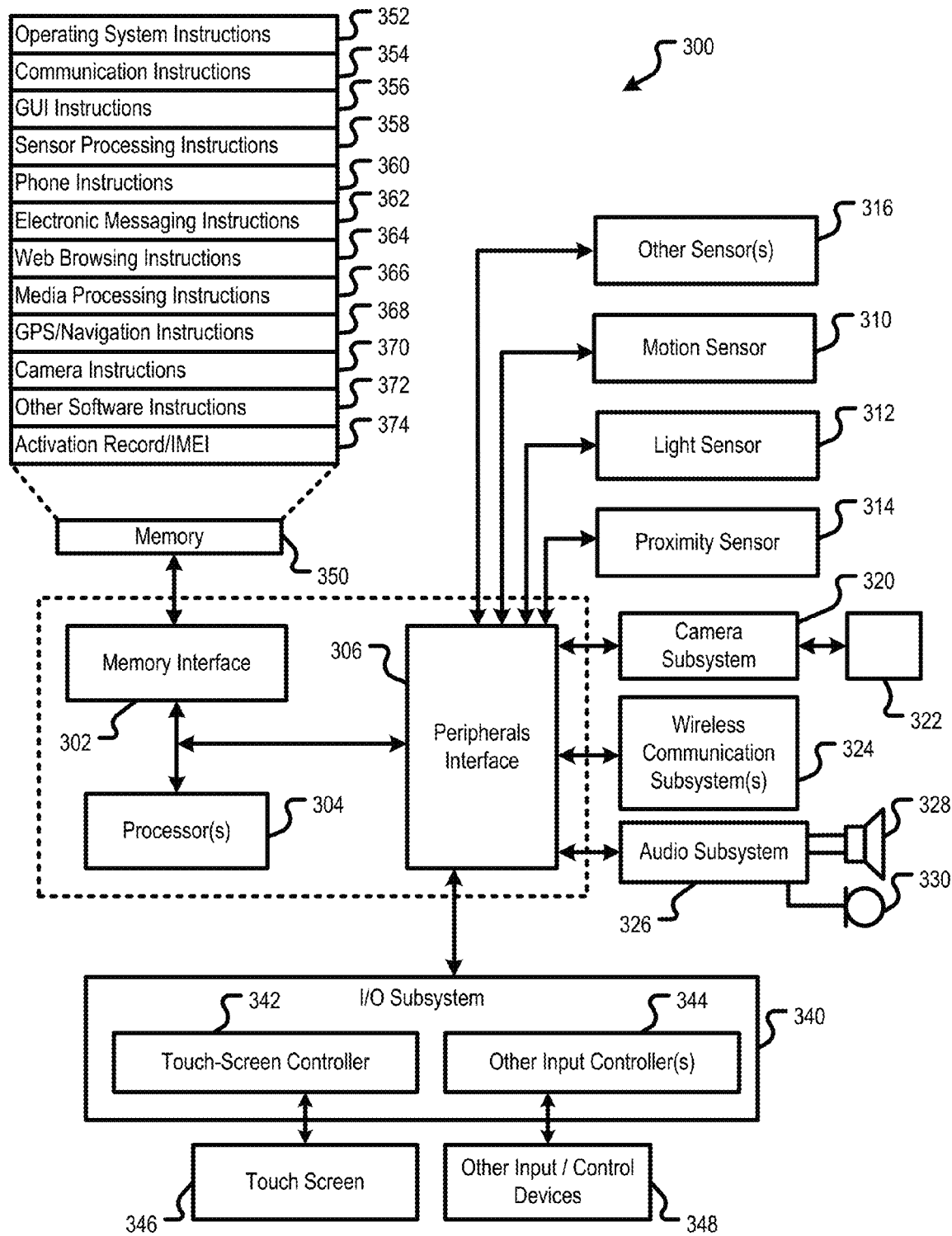
FIG. 3 shows an example of a mobile device.

FIG. 3 shows an example of a mobile device 300. Mobile device 300 can include a memory interface 302, one or more data processors, image processors and/or central processing units 304, and a peripherals interface 306. Memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322 (e.g., a charged coupled device ("CCD") or a complementary metal-oxide semiconductor ("CMOS") optical sensor) can be utilized to facilitate camera functions, such as recording photographs and video clips.

Communication functions of the mobile device 300 can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. Wireless communication subsystems 324 can include hosting protocols such that the mobile device can be configured as a base station for other wireless devices.

An audio subsystem 326 can be coupled to a speaker 328 and a microphone 330 to facilitate voice-enabled functions, such as voice recognition, voice replication, digital recording, and telephony functions.

I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies.

Other input controller(s) 344 can be coupled to other input/control devices 348, such as, without limitation, one or more buttons, rocker switches, thumb-wheel, infrared port, USB port, and/or a pointer device such as a stylus. The one or more buttons (not shown) can include an up/down button for volume control of the speaker 328 and/or the microphone 330.

In some implementations, a pressing of the button for a first duration can disengage a lock of the touch screen 346, and a pressing of the button for a second duration that is longer than the first duration can turn power to the mobile device 300 on or off. The user can customize the functionality of the buttons in any desirable manner. Touch screen 346 also can be used to implement virtual or soft buttons and/or a keyboard.

In some implementations, mobile device 300 can present recorded audio and/or video files, such as, without limitation, MP3, AAC, and MPEG files.

Memory interface 302 can be coupled to the memory 350. Memory 350 can include high-speed random access memory and/or non-volatile memory, such as one or more magnetic disk storage devices, one or more optical storage devices, and/or flash memory (e.g., NAND, NOR). Memory 350 can store an operating system 352, such as, without limitation, Darwin, RTXC, LINUX, UNIX, OS X, WINDOWS, or an embedded operating system such as VxWorks. Operating system 352 can include instructions for handling basic system services and for performing hardware dependent tasks. In some implementations, operating system 352 can be a kernel (e.g., UNIX kernel). If the service provider permits porting out line numbers, the service provider can require an authorization form.

Memory 350 can also store communication instructions 354 to facilitate communicating with one or more additional devices, one or more computers and/or one or more servers. Memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions;

and/or other software instructions 372 to facilitate other processes and functions (e.g., processes associated with call management using location-aware mobile devices as will be described in reference to FIGS. 4-9).

Memory 350 also can store other software instructions (not shown), such as web video instructions to facilitate web video-related processes and functions, and/or web shopping instructions to facilitate web shopping-related processes and functions. In some implementations, media processing instructions 366 can be divided into audio processing instructions and video processing instructions to facilitate audio processing-related processes and functions and video processing-related processes and functions, respectively. An activation record and International Mobile Equipment Identity ("IMEI") 374 or similar hardware identifier also can be stored in the memory 350.

Each of the above identified instructions and applications can correspond to a set of instructions for performing one or more functions described above. These instructions need not be implemented as separate software programs, procedures, or modules. Memory 350 also can include additional instructions or fewer instructions. Furthermore, various functions of the mobile device 300 can be implemented in hardware and/or in software, including in one or more signal processing and/or application specific integrated circuits.

Call Management Process

Figure 4:
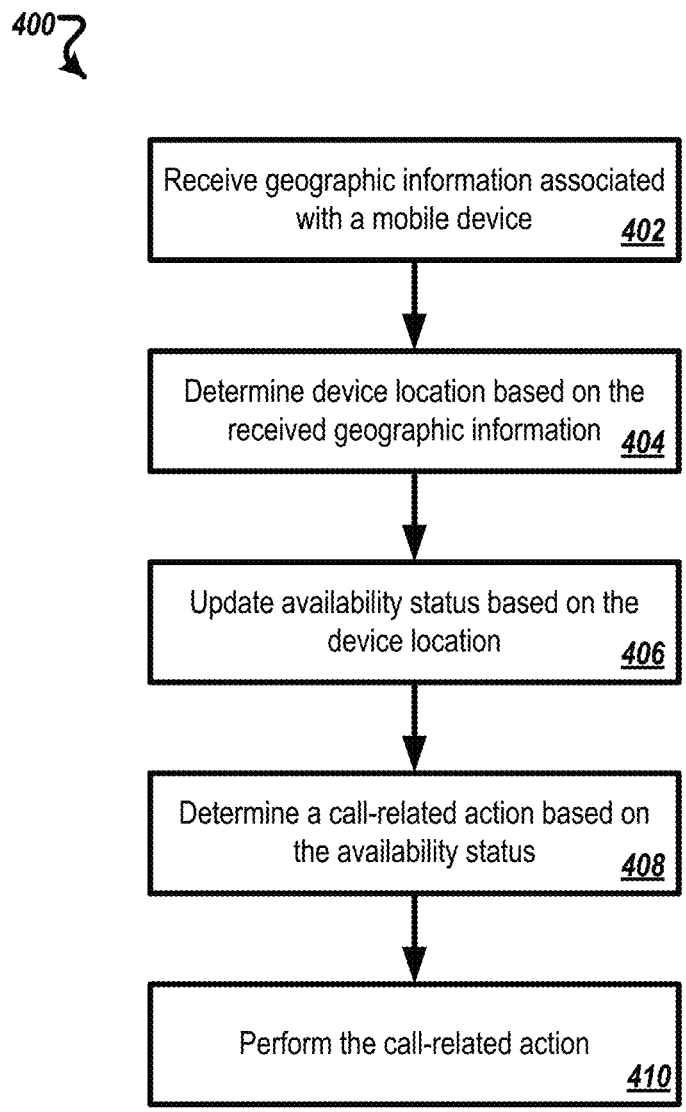
FIG. 4 shows an example of a process for managing an incoming call to a mobile device.

FIG. 4 shows an example of a process 400 for managing an incoming call to a mobile device. The process 400 can be performed, for example, by the call management system 100, and for clarity of presentation, the description that follows uses the call management system 100 as the basis of examples for describing the process 400. However, another system, or combination of systems, can be used to perform the process 400.

Process 400 begins with receiving geographic information (402). For example, a device locator (e.g., device locator 560 shown in FIG. 5) of a call control manager (e.g., call control manager 130) in a vPBX system can receive geographic information associated with the mobile device 102 (and other communication devices) connected to the vPBX system. The geographic information can include a set of geographic coordinates that identify the physical location of the mobile device 102. The geographic coordinates can contain, for example, latitude, longitude, and altitude information. Latitude (e.g., which gives the location of a place on earth north or south of the Equator) and longitude (e.g., angular distance measured east or west from the prime meridian) information can be used in identifying, for example, the location of the mobile device 102 on a map. Altitude information can be used in identifying, for example, the vertical distance between the mobile device 102 and a reference point (e.g., either Mean Sea Level or local ground level).

The geographic location of the mobile device 102 can be determined in a variety of ways. For example, a GPS receiver integrated with, or coupled to, the mobile device 102 can determine the physical location of the mobile device 102. A triangulation program can also be used to determine the geographic location of the mobile device 102, for example, by measuring the relative position of the mobile device 102 against reference places with ascertained geographic positions (e.g. ELF/microwave or cell phone transmission towers). In some implementations, the relative position of the mobile device 102 can be measured, for example, by calculating a time difference between the towers for receiving a signal from the mobile device 102. The triangulation program can operate on a server in a network to which the mobile device 102 is connected. The triangulation program can also operate on the mobile device 102, and determine the geographic coordinates of the mobile device 102 such as by referencing a list of predefined or referenced places on the mobile device 102.

In some implementations, the mobile device 102 can transmit its geographic information to the vPBX network. In some implementations, a client application can be invoked to transmit the geographic information periodically or at fixed intervals (e.g., every five minutes).

In some implementations, the mobile device 102 can run a client application that triggers the transmission of the geographic information according to one or more predetermined rules. For example, the mobile device 102 can store one or more sets of rules each associated with geographic coordinates of one or more predefined "areas" (e.g., home, office, and the like), and manually set a "triggering" area. When the mobile device 102 determines, based on the geographic coordinates (e.g., those that are most recently received), that the mobile device 102 has traveled into a different area (e.g., moved away from an area designated as "Office" and into an area designated as "Home"), the mobile device 102 can send a request to the vPBX system to update the location of the mobile device 102. The foregoing triggered update technique can reduce the number of unnecessary updates and free up any congested traffic that can clog the vPBX system.

In some implementations, the vPBX can also acquire the geographic coordinates of the mobile device 102 (e.g., through the device locator 560 shown in FIG. 5) such as by polling the mobile device 102. For example, the vPBX system can send a command signal to the mobile device 102, and in response, the mobile device 102 can transmit its geographic coordinates back to the vPBX system. In some implementations, the polling can be periodic. In some implementations, the polling can be triggered by an event. An example of a triggering event can include receiving, by the vPBX system, an incoming call from a communications device within or outside the vPBX network.

Device location can be determined based on the geographic information (404). For example, the mobile device 102 can include a device locator (e.g., device locator 560 shown in FIG. 5), and the device locator can determine a location of the mobile device 102 based on the geographic coordinates of the mobile device 102. In some implementations, such a determination can be made by mapping the received geographic coordinates with one or more location rules (e.g., existing rules that are stored in a location database). In some implementations, the vPBX system recognizes a match when the received geographic coordinates match a stored set of geographic coordinates. For example, a match exists when the received geographic coordinates are identical to an existing set of coordinates in the location database. As another example, a match exists when the received geographic coordinates are within a predetermined proximity distance of an existing set of coordinates. In some implementations, the vPBX system recognizes a match when the received geographic coordinates are within a particular area or space defined by an existing set of vertices in the location database. For example, a match exists when the latitude, longitude, and altitude information of the mobile device 102 convey that the mobile device 102 is within a predetermined space (e.g., "Home").

Availability status can be updated based on the device location (406). In some implementations, the device locator can receive (or detect) new or updated geographic coordinates of the mobile device 102. Based on these new or updated geographic coordinates, the device locator can update the availability status associated with the mobile device 102. In some implementations, the availability status associated with the mobile device 102 can be stored in an availability status database (e.g., availability status database 575). When an availability status update is needed, the device locator can access the availability status database, locate the "old" availability status and modify the "old" availability status with the new or updated availability status. The availability status database can store past and current location information associated with the mobile device 102 (and other communications devices that are connected to the vPBX network). In some implementations, the mobile device's availability status can be transmitted to other mobile or communications devices.

A call-related action based on the availability status can be determined (408). In some implementations, the call control manager 130 can include an action mapper (e.g., action mapper 580 shown in FIG. 5), and the action mapper can determine a call-related action based on the availability status of the mobile device 102. For example, upon receiving a phone call to the mobile device 102, the action mapper can retrieve availability status information from the availability status database. Based on the availability status the action mapper can then identify a call-related action based on the knowledge that the mobile device 102 is at a predetermined location (e.g., "Home"). For example, the action mapper can identify the call-related action as an action to forward the call to a predefined landline number (e.g., a landline phone number for "Home").

The call-related action can be performed (410). Using the example described above, an incoming call to the mobile device 102 can be forwarded (e.g., by the call control manager 130) to the landline number associated with "Home."

Operations 402-410 can be performed in the order listed, in parallel (e.g., by the same or a different process, substantially or otherwise non-serially), or in reverse order to achieve the same result. In some implementations, operations 402-410 can be performed out of the order shown. For example, a call-related action can be determined before updating the availability status database.

Availability Status Manager

Figure 5:
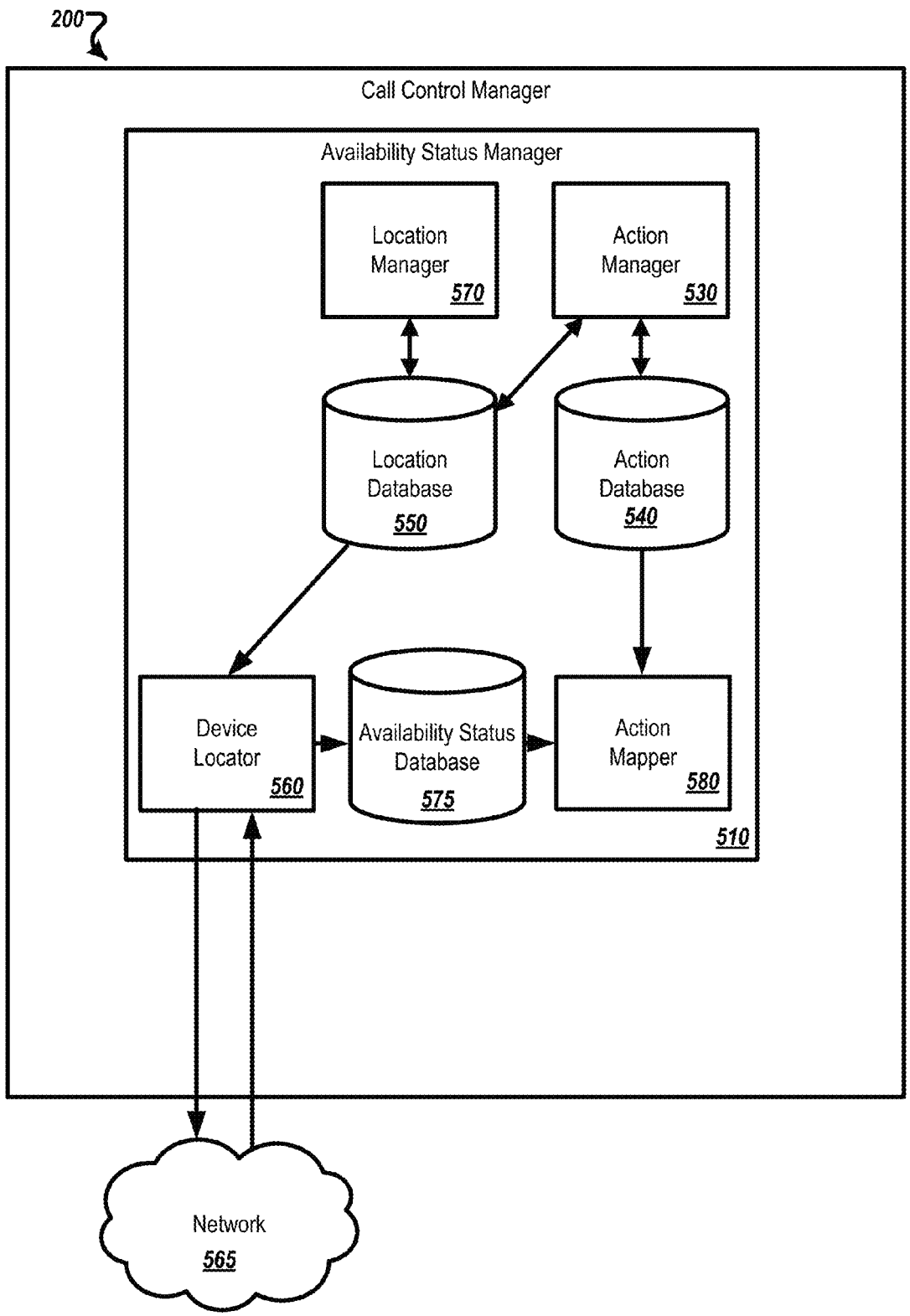
FIG. 5 show an example of an availability status manager.

FIG. 5 shows an example of an availability status manager. Call control manager 130 can include an availability status manager 510. The availability status manager 510 can interact with other components of the call control manager 130 including, without limitation, bridge manager 132, configuration manager 134, and call connection manager 210 to manage voice and data communications in the vPBX network.

Availability status manager 510 can include an action manager 530 and an action database 540. Action database 540 can store one or more action rules, and action manager 530 can handle the management and organization of the action rules. In some implementations, an action rule can define a call-related action that can be performed (e.g., by the call control manager 130) when a triggering event occurs (e.g., when the mobile device 102 at a given location receives an incoming call). As an example, a call-related action rule can define a rule under which an incoming call is to be forwarded to an office landline phone number if the geographic coordinates of the mobile device 102 convey that the mobile device 102 is located in the "Office." Action manager 530 can add, edit, and delete one or more new or existing action rules in the action database 540. The action manager 530 also can interact with other components of the call control manager 130 to provide user interface capability to facilitate the adding, editing, and deleting of the action rules in the action database 540, as will be discussed in greater detail below with respect to FIGS. 8A-8F.

In some implementations, availability status manager 510 also can include a location database 550 and a location manager 570. Location manager 570 can include tools for modifying one or more location rules in the location database 550. In some implementations, the one or more location rules can associate one or more location statuses with a particular geographic location. For example, location database 550 can include a location rule that identifies the location status of the mobile device 102 as "Office" when the mobile device 102 travels within a predetermined distance (e.g., five meters) from a particular area (e.g., an area defined by latitude x, longitude y, and altitude z). In some implementations, the predetermined distance can be a proximate distance, and need not require an exact location match.

As another example, location database 550 can include a location rule that identifies the location of the mobile device 102 as "Home" when the mobile device 102 is located within a space defined by a set of vertices (e.g., an area bounded by vertices A, B, C, D, E, F, and H). In this example, the geographic coordinates of vertices A through H can be stored in the location database 550.

The availability status manager 510 also can include an availability status database 575. The availability status database 575 can store the most current availability status of one or more mobile devices connected to the vPBX network. The availability status of a mobile device can describe the location status of the mobile device (e.g., "Home," "Out of Town," or "Office").

The availability status manager 510 also can include a device locator 560. Device locator 560 can receive geographic information associated with mobile devices that are within the vPBX network. In some implementations, device locator 560 can communicate with other components of the call control manager 130, such as to obtain geographic information over a communication network 565.

In some implementations, availability status manager 510 can actively poll the mobile device 102 or passively receive the geographic information from the mobile device 102. After receiving current geographic information from the mobile device 102, device locator 560 can match the received geographic information with the location rules in the location database 550. Matching criteria can require an exact match, a proximate match (e.g., where the received geographic coordinates are within a predetermined proximity distance of a predefined location), or a space match (e.g., where the current geographic coordinates are within a space defined by a predefined set of vertices). Once a match is found, the device locator 560 can update the availability status database 575 to reflect the new geographic coordinates of the mobile device 102.

When the call control manager 130 detects a call to the mobile device 102, the call control manager 130 can check the availability status of the mobile device 102 by, for example, querying the availability status database 575. The call can be initiated from outside or within the vPBX network. The action mapper 580 can query both the availability status database 575 and the action database 540 to identify one or more call-related actions to be performed on the incoming call. For example, if the availability status database 575 indicates the availability status of the mobile device 102 as "Away" or "At Work" and the corresponding action rule can require that the incoming call be routed to an answering machine connected to a residence home phone for message recording. Thereafter, action mapper 580 can instruct the call control manager 130 to reroute the incoming call to the residence home phone.

Example User Interface for Editing Location Rules

Figure 6:
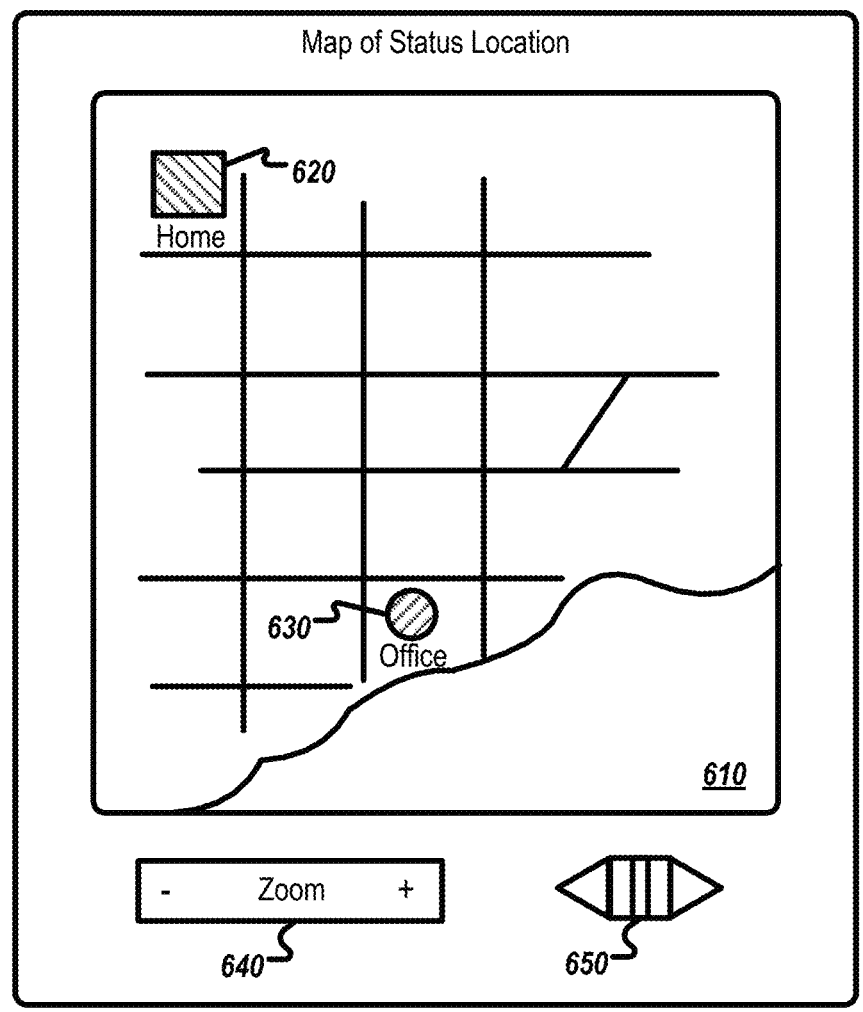
FIG. 6 shows an example of a display indicating an availability status of a mobile device.

FIG. 6 shows an example of a display indicating an availability status of a mobile device. Referring to FIG. 6, the user interface 600 can display a user-selected view of a digital map 610. The digital map 610 can present one or more areas (e.g., districts, cities, states, countries, and the like) or entities (e.g., buildings, structures, houses, and the like) on the display. In some implementations, a location rule can be established for each area or entity. For example, a user can identify a specific area or entity, create a location rule for the identified area or entity, and store the created location rule in the location database 550. The user can also access the stored location rule if changes to the location rule need be made.

In some implementations, the areas or entities displayed on the digital map 610 can be presented with graphical effects. For example, area 620 (labeled as "Home") displayed on the digital map 610 can be highlighted. As another example, area 630 (labeled as "Office") can also be highlighted. In some implementations, only areas that are linked to active location rules are highlighted. For example, if a location rule has been created for area 620, then area 620 can be displayed with a special graphical effect. As another example, if no location rule has been established for area (e.g., area 630), then the area can be displayed to the user without any graphical effect.

In some implementations, the shape and size of an area can be determined based on a proximity distance parameter defined in a location rule. For example, a location rule can be created for area 620 that defines the location status of the mobile device 102 as "Home" upon detecting that the mobile device 102 has traveled within a rectangular region bound by four predefined vertices A, B, C and D. As another example, a location rule can be created for area 630 associating area 630 with a proximity distance. In this example, the size of area 630 can be determined by the value of the proximity distance.

In some implementations, the zoom control 640 and scroll control 650 can be used to navigate the digital map 610. Other navigation controls also are possible. In some implementations, the user of the mobile device 102 can activate an "edit" mode to change or delete a previously-defined status location by, for example, tapping the associated area. A user can re-designate area 630 from "Office" to "Parents' Home" or change the proximity distance parameter associated with area 630 by, for example, tapping area 630 on the display. The user can also enable a "new" mode to create a new mapping by, for example, tapping a new area on the digital map 610.

Example User Interface for Defining Availability Status

Figure 7:
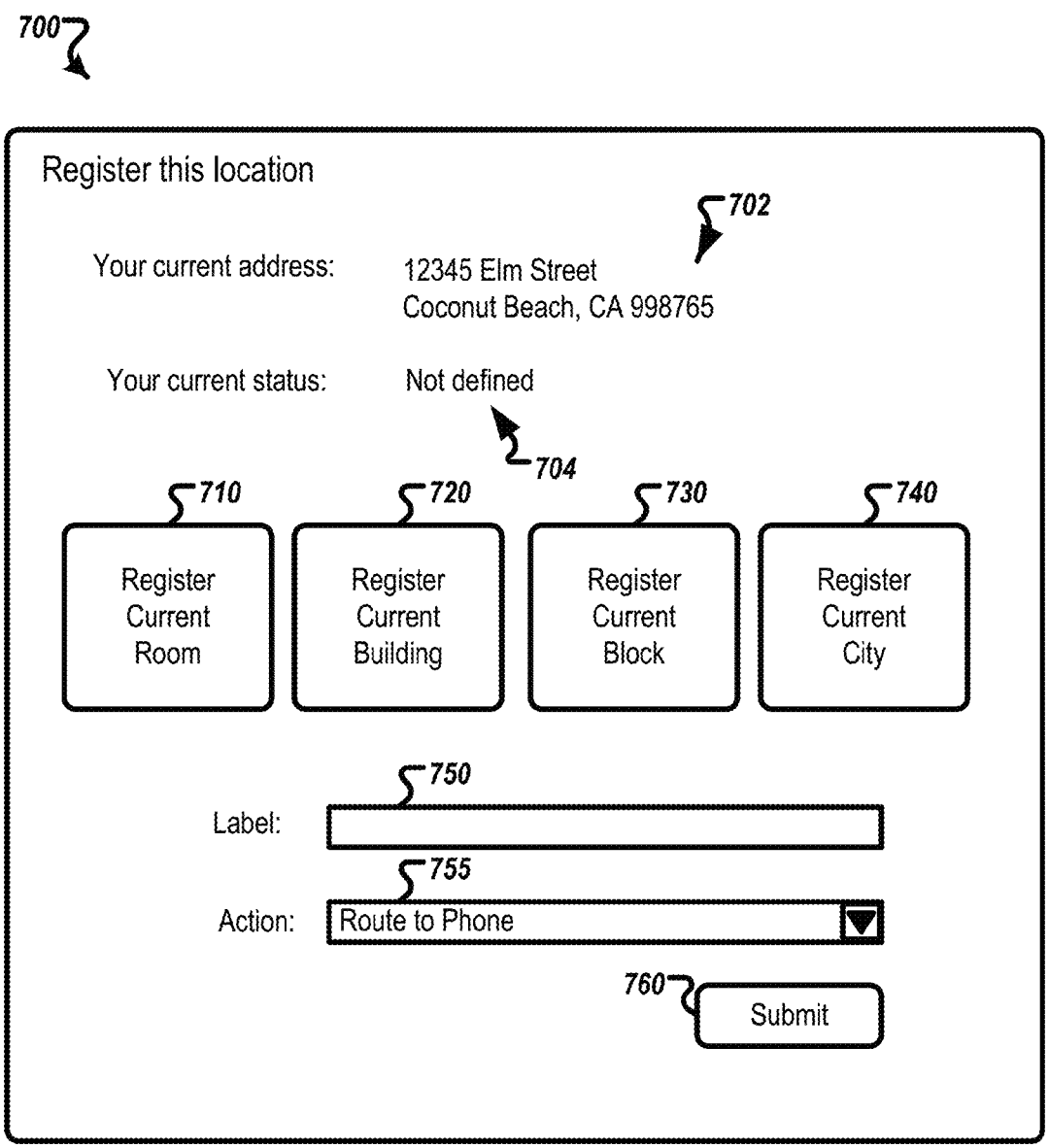
FIG. 7 shows an example of a user interface that allows a user to define an availability status of a mobile device based on a present location of the mobile device.

FIG. 7 shows an example of a user interface 700 that allows a user to define an availability status of a mobile device based on a present location of the mobile device. User interface 700 can be used to display information that assists a user in identifying a current location of the mobile device 102. For example, user interface 700 can display the current address 702 where the mobile device 102 is located. The current address 702 can be determined based on the current geographic location of the mobile device 102.

In some implementations, user interface 700 can be a touch-screen interface, and receive touch-screen input. In some implementations, touch-screen input can be received through one or more graphical buttons 710, 720, 730 and 740 displayed in the user interface 700. The one or more graphical buttons 710-740 can be configured to perform a variety of call-related, non-call-related or user-related functions. In some implementations, one or more graphical buttons 710-740 can be configured to associate the user's current location with a proximity distance parameter. For example, user interface 700 can display a button 710 configured to associate the user's current location with a proximity distance parameter set at, for example, five meters. Once the proximity distance parameter has been set, the vPBX system can register the mobile device 102 to be at this location whenever the mobile device 102 travels within, in this example, five meters of the current location. Similarly, user interface 700 can display a second button 720 configured to set a proximity distance parameter at, for example, twenty meters; a third button configured to set the proximity distance parameter, for example, to one hundred meters; and a fourth button 740 configured to set the proximity distance parameter, for example, to five miles.

In some implementations, instead of setting a proximity distance parameter, a boundary feature can be selected. For example, a room, a building, a street, and a city can be predefined with a particular boundary, and each button 710-740 can be configured to associate the user's current location to a defined boundary corresponding to the room, building, street and city. Other boundary features having predefined boundaries also are contemplated. In some implementations, these boundary features can be retrieved using the Topologically Integrated Geographic Encoding and Referencing system (TIGER) of the United Status Census Bureau.

User interface 700 can also display a label input area 750. In some implementations, label input area 750 can be either a text box or a drop down menu (or an editable drop down menu). Where a drop down menu is used, the drop down menu can display the user's existing labels (e.g., "Home," "Office," and the like) as menu items. Upon selecting label input area 750, user interface 700 can also display a graphical keyboard through which an area can be assigned with a label.

User interface 700 can also display an action input area 755 through which one or more call-related actions can be created. For example, a user can add a new location (e.g., "city hall"), and associate the new location with a call-related (or non-call-related actions) action rule. The action can be a predefined action listed as a menu item associated with the action input area 755. Examples of call-related actions (or non-call-related actions) can include, without limitation, routing a phone call to a landline number, routing a phone call to another mobile device, routing a phone call to a voice mail recorder, and the like.

User interface 700 can also display a "submit" button 750. Upon activating the "submit" button 750, mobile device 102 can transmit the current address 702 associated with the mobile device 102, the proximity distance parameter (or geographic boundaries) associated with the current address 702, the availability status 704 associated with the current address 702, and a corresponding call-related action to the vPBX system. In some implementations, data associated with the proximity distance parameter and the geographic boundaries of the current address 702 can be stored in the location database 550; data associated with the current location and call-related action can be stored in the action database 540; and data pertaining to the availability status of the mobile device 102 can be stored in the availability status database 575.

Example User Interface for Editing Action Rules

Figures 8A, 8B, 8C:
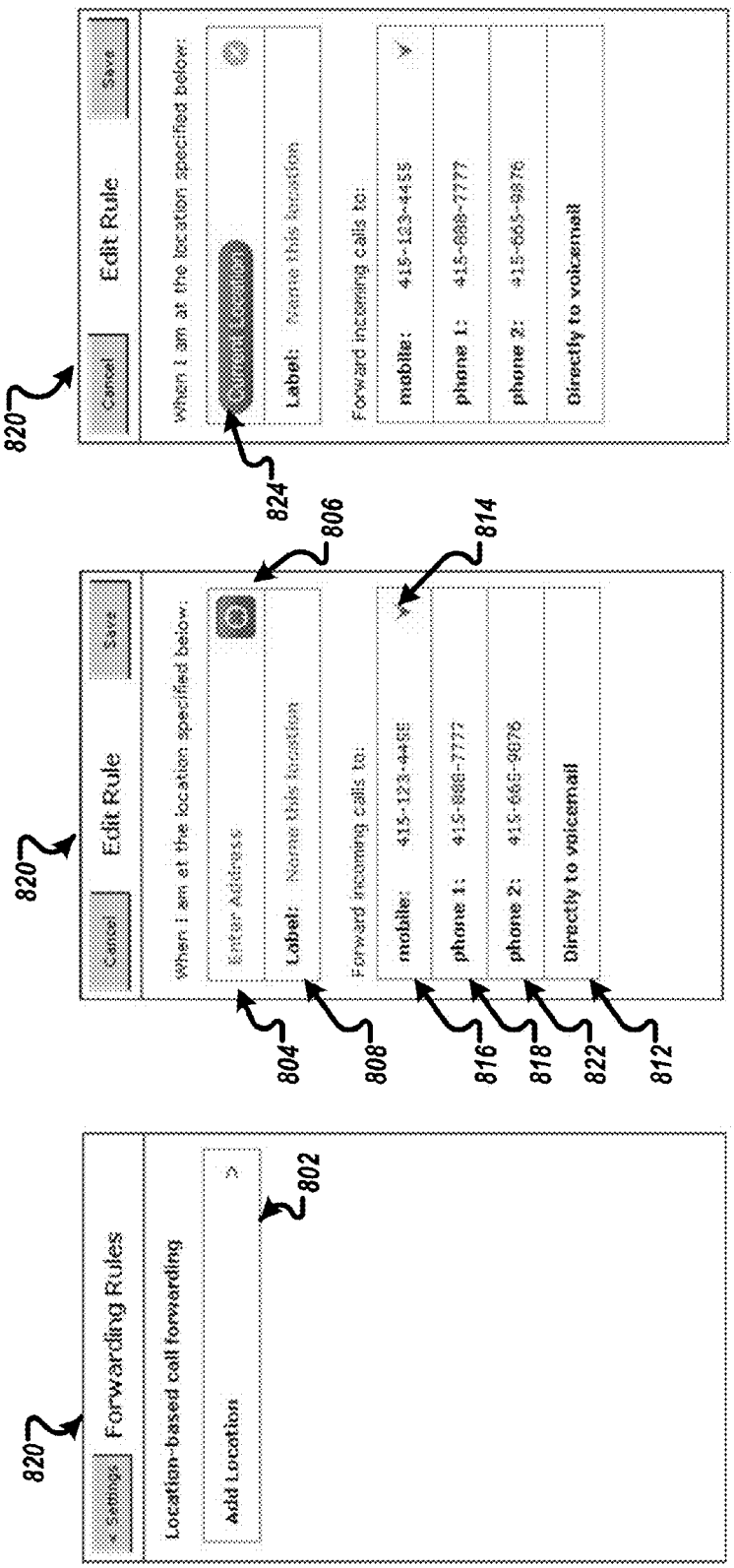
FIGS. 8A-8F each show an example of a user interface for editing action rules and location rules.

FIGS. 8A-8F each show an example of a user interface for editing action rules and location rules. Referring to FIG. 8A, a user can define an action-based call forwarding rule through a user interface 820. An action-based call forwarding rule, once established, can command the vPBX system to forward or reroute an incoming call to a specified entity or device when the incoming call is received at a specific geographic location, proximate to the specific geographic location (e.g., as dependent upon the proximity distance parameter), or within a specific geographic space (e.g., as dependent upon the boundaries and vertices of the space defined). As shown, the user can activate or press the "add location" entry field 802 to add a geographic location. The geographic location can be manually entered by the user (as will be discussed with respect to FIG. 8D) or automatically inserted by the mobile device (as will be discussed with respect to FIG. 8C).

FIG. 8B shows various entry fields of a user interface 820 through which a user can add an action rule. Referring to FIG. 8B, user interface 820 can include an address entry field 804 in which an address or location can be inserted. User interface 820 can also include a label field 808 that allows a label to be assigned to the geographic location entered in address entry field 804.

User interface 820 can also include a call-forwarding action entry field 812 so as to allow an incoming call to be forwarded to a designated phone number (i.e., as defined in the call-forwarding action entry field 812). For example, the user can add to the call-forward action entry field 812 a phone number "415-123-4455". In some implementations, call-forwarding action entry field 812 can include more than one phone number entry. For example, the call-forwarding action entry field 812 can include three entry fields 816, 818 and 822 each associated with a different phone number to which the vPBX system can forward the incoming call. In some implementations, the multiple phone entries can be ranked by the user such that an incoming call is forwarded to the phone number that is ranked the highest. If the line associated with the phone number with the highest rank is unavailable, the incoming call can be rerouted to the phone number with the next highest rank. In some implementations, a control element 814 can be displayed adjacent to the phone number with the highest rank to visually aid the user in identifying the phone number to which all incoming calls are to be forwarded. Data entered in the address entry field 804, label entry field 808 and call-forwarding action entry field 812 can be stored as parts of an action rule in the vPBX system.

In some implementations, the user also can activate the control element 806 to automatically insert the current location of the mobile device into the address entry field 804. After activating the control element 806, a display element 824 (e.g., labeled "current location") can be displayed indicating that the current location of the mobile device has been inserted into the address entry field 802. In some implementations, a user can activate or press the display element 824 to register the current location of the mobile device with the vPBX system. The current location of the mobile device can be determined by, for example, a GPS receiver integrated with the mobile device, or by running a triangulation program.

Figure 8F:
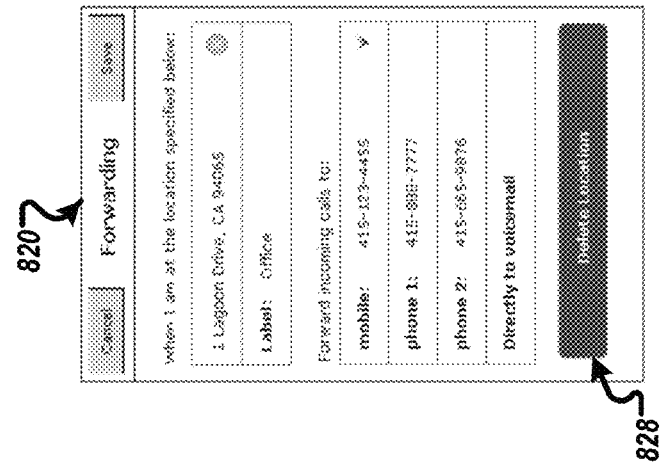
Figure 8E:
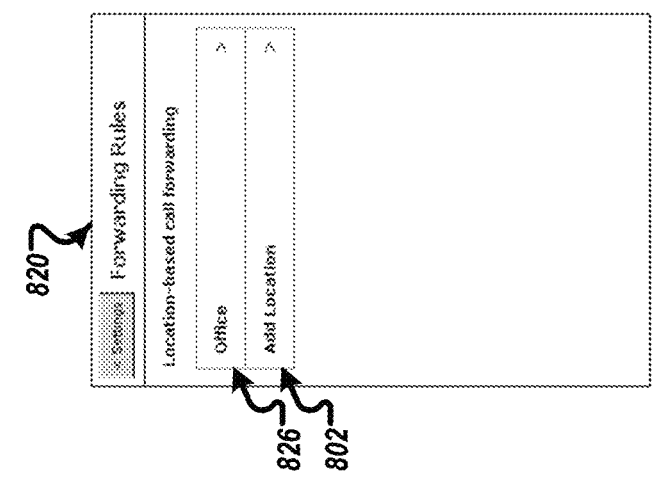
Figure 8D:
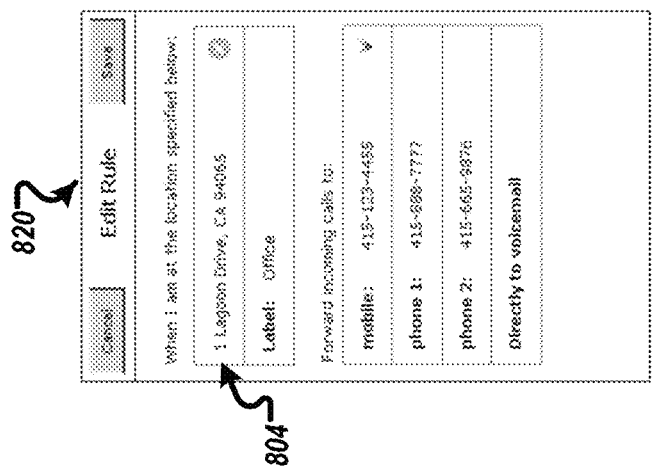

Referring to FIG. 8D, the user can manually enter an address into the address field 804. The address entry field 804 can be in the form of a text box in which the user can manually input an address. As shown, the user can input the address "1 Lagoon Drive, CA 94805" into the address entry field 804. A label also can be assigned to the entry. For example, the label "Office" can be assigned to the address "1 Lagoon Drive, CA 94805." In some implementations, address entry field 804 can include and present a map upon which the user can manually select a geographic location.

After creating an action rule, a new action profile 826 corresponding to the newly created rule can be generated and displayed to the user, as shown in FIG. 8E. Specifically, new action profile 826 can be presented to the user after the user has entered a location mapping and an associated action. The user interface can display two entry fields; namely, an "Office" profile 826 and the "Add Location" entry field 802. Selecting (e.g., tapping) the "Add Location" entry field 802 can bring up the address entry field 804, the label entry field 808 and the call-forwarding action entry field 812 (e.g., as shown in FIG. 8B) through which the user can create a new profile defining the parameters of an action rule. Tapping the "Office" profile 826 allows, for example, the parameters of the action rule associated with "Office" (e.g., as shown in FIG. 8D) to be displayed.

In some implementations, an existing action profile can be removed. For example, as shown in FIG. 8F, the user interface 820 can include a delete button 828. Upon activating delete button 828, the "Office" profile 826 defining the parameters of a call-forwarding action rule can be permanently deleted.

Rules Database Table

FIG. 9 illustrates an example of a rule database table 900. At least one mobile device (e.g., mobile device 102) in the vPBX system can store a rule database table 900. As shown in FIG. 9, rule database table 900 can include a latitude (LAT) column 910, a longitude (LONG) column 920, an altitude (ALT) column 930, a proximity distance parameter column 940, a location column, and an action column 960. The LAT column 910 can include latitude information (e.g., N33.7817); the LONG column 920 can include longitude information (e.g., −117.5835); and the ALT column 930 can include altitude information (e.g., +50 for 50 meters above sea level). The proximity distance parameter column 940 can include the proximity distance parameter of a location (e.g., 20 for 20 meters). The location column 950 can include a location label (e.g., "Office"). Action column 960 can include information associated with a defined action that can be performed when the mobile device travels to a region within the proximity distance or radius of a particular geographic location (e.g., the location as defined by the LAT column 910, the LONG column 920, and the ALT column 930). In the example shown, when the mobile device is at the "office" location, an incoming call can be forwarded to a desk phone associated with the user's office.

Rule database table 900 illustrates an implementation in which action rules and location rules can be stored in a converged location and action database. Each mobile device connected to the vPBX system can be configured to include the database table 900. In some implementations, action rules and location rules need not be in a converged database.

Other implementations are possible. For example, separate action and location databases can be used to convey the same information contained in the rule database table 900.

While FIG. 9 is described with reference to a proximity distance parameter, other implementations also are possible including those that use of a geometric feature. For example, the location database 550 can store various geometric shapes (e.g., polygons) and their associated vertices (e.g., vertices of the polygons). In this example, simple geometrical calculations can be applied to determine if a current location of the mobile device is within the polygon whose vertices are already known.

In some implementations, mobile device 102 can include a GPS receiver or other positioning system to identify the moving speed of the mobile device 102. In some implementations, the rule database table 900 also can include a moving status field 970. If the mobile device 102 is moving at a speed that is greater than a pre-determined threshold, the moving status of the mobile device 102 can be changed from "stationary" to "driving", the value of which can be noted in the moving status field. In some implementations, a warning or a pre-recorded message can be played to a caller of an incoming call before the incoming call is connected to the mobile device 102 to alert the caller that the mobile device 102 is in a moving vehicle. In some implementations, the moving status of the mobile device 102 also can be used with other location rule criteria in the rule database table 900. For example, when the mobile device 102 is at the "Office" location and is "stationary", an incoming call can be forwarded to a desk phone associated with the user's office.

In some implementations, mobile device 102 can include a built-in accelerometer and/or gyroscope used to determine whether the mobile device 102 is in a vertical or horizontal position, facing up and down, and the like. Based on the detected position, the current availability status of the user can be inferred. For example, if the mobile device 102 is in a horizontal position, it can be inferred that the mobile device 102 is not in use or that the user of the mobile device 102 is not busy. As another example, if the mobile device 102 is in a vertical position, it can be inferred that the mobile device 102 is in use, and the vPBX system can automatically change the current availability status of the mobile device 102 to a "do not disturb" status.

In some implementations, the vPBX system can place one or more calls in a customer support queue based on the geographic location (e.g., via GPS) of the mobile device 102 instead of using an area code.

Generic Computing Devices

Figure 10:
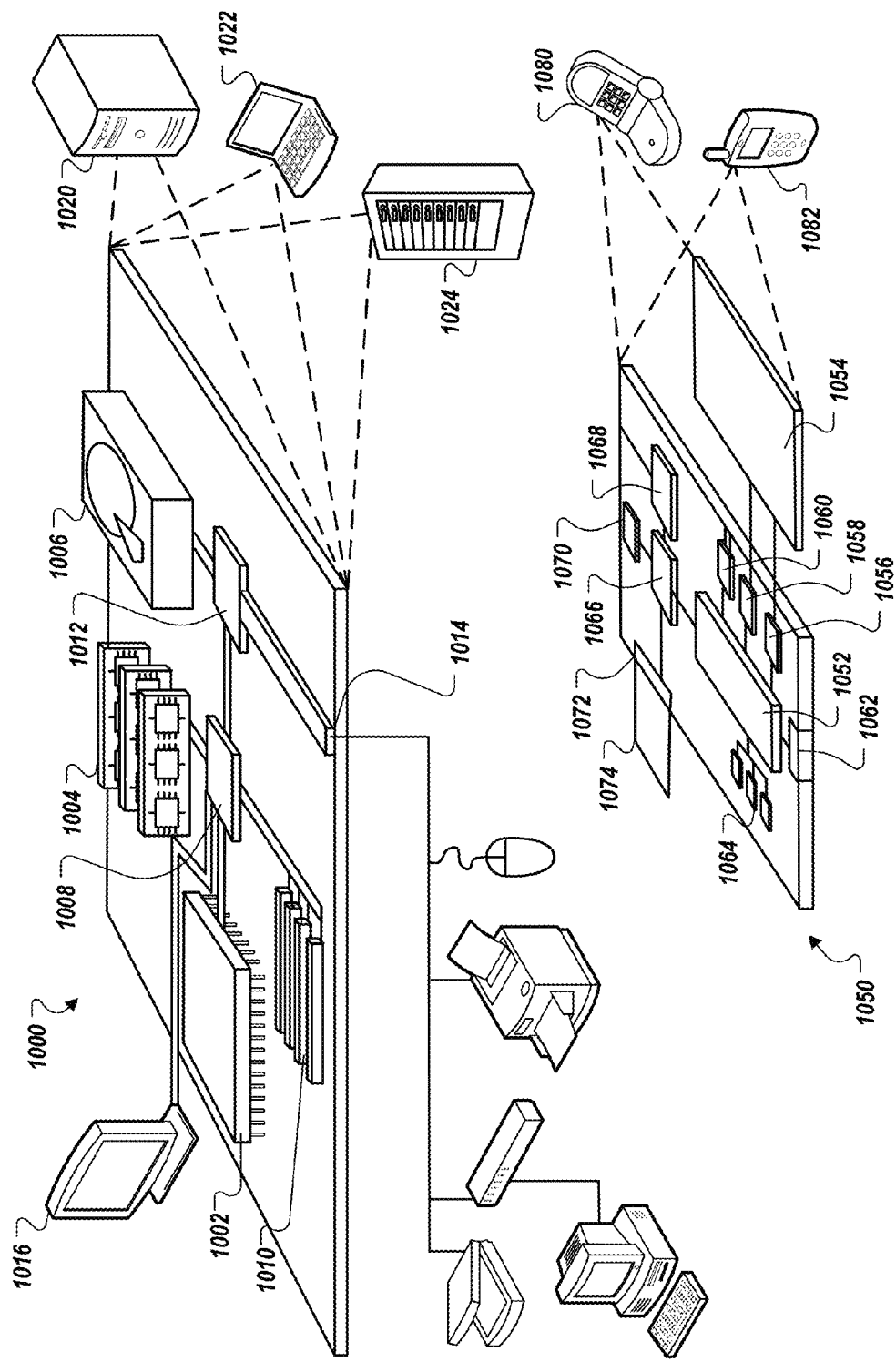
FIG. 10 is a block diagram of two exemplary generic computing devices that can be used to implement processes and methods described in relation to the call management system shown in FIG. 1.

FIG. 10 is a block diagram of two computing devices that can be used to implement processes and methods described in relation to the call management system shown in FIG. 1. Computing device 1000 can represent various forms of digital computers, such as laptops, desktops, workstations, personal digital assistants, servers, blade servers, mainframes, and other appropriate computers (e.g., user terminal 126). Computing device 1050 can represent various forms of mobile devices, such as personal digital assistants, cellular telephones, smartphones, and other similar computing devices used to place or receive the calls. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can process instructions for execution within the computing device 1050, including instructions stored in the memory 1064. The processor may also include separate analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD display or an OLED display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication (e.g., via a docking procedure) or for wireless communication (e.g., via Bluetooth or other such technologies).

The memory 1064 stores information within the computing device 1050. In one implementation, the memory 1064 is a computer-readable medium. In one implementation, the memory 1064 is a volatile memory unit or units. In another implementation, the memory 1064 is a non-volatile memory unit or units. Expansion memory 1074 may also be provided and connected to device 1050 through expansion interface 1072, which may include, for example, a SIMM card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS receiver module 1270 may provide additional wireless data to device 1050, which may be used as appropriate by applications running on device 1050.

Device 1050 may also communication audibly using audio codec 1060, which may receive spoken information from a user and convert it to usable digital information. Audio codex 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications can be made without departing from the spirit and scope of the invention. For example, the examples were given in C programming language. However, the programmable compiler can be implemented for any imperative computer programming language. Also, the function exp was given to illustrate the efficiency of a reduced accuracy routine. Other mathematical functions can be written to increase efficiency from the standard functions. Accordingly, other implementations are within the scope of the following claims.

A number of implementations of the invention have been described. Nevertheless, it will be understood that various modifications can be made without departing from the spirit and scope of the invention. Accordingly, other implementations are within the scope of the following claims.

What is claimed is:

1. A method comprising:
    receiving, by one or more computers, a first call intended for a mobile device;
    determining, by the one or more computers, that the mobile device is located in a predetermined geographic location;
    determining, by the one or more computers, that the mobile device is stationary, including:
        determining an estimated speed for the mobile device,
        determining that the estimated speed for the mobile device does not exceed a predetermined speed threshold, and in response to determining that the estimated speed for the mobile device does not exceed the predetermined speed threshold, determining that the mobile device is stationary; and in response to determining that the mobile device is located in the predetermined geographic location and determining that the mobile device is stationary, routing, by the one or more computers, the first call intended for the mobile device to another device.

2. The method of claim 1, wherein determining that the mobile device is located in the predetermined geographic location comprises:

receiving geographic information from the mobile device; and determining from the geographic location that the mobile device is located in the predetermined geographic location.

3. The method of claim 2, further comprising:

providing, by the one or more computers, location instructions to the mobile device that, when executed by the mobile device, cause the mobile device to transmit the geographic information to the one or more computers in response to determining that the mobile device has entered the predetermined geographic location.

4. The method of claim 1, further comprising:

generating a call-related action rule that defines a call-related action that specifies that, when the mobile device is in the predetermined geographic location calls and the mobile device is stationary, calls intended for the mobile device should be routed to the other device; and wherein routing the first call intended for the mobile device to the other device comprises applying the call-related action to the first call based on determining that the mobile device is stationary and in the predetermined geographic location.

5. The method of claim 4, wherein generating the call-related action rule comprises:

providing, for presentation on the mobile device, a user interface for configuring call-related action rules;

receiving rule data from the mobile device; and generating the call-related action rule based on the rule data received from the mobile device.

6. The method of claim 5, wherein receiving rule data comprises receiving data defining the predetermined geographic location.

7. The method of claim 1, wherein:

determining that the mobile device is stationary comprises:

receiving data identifying a moving speed of the mobile device from the mobile device, and determining the estimated speed of the mobile device based on the data.

8. The method of claim 7, further comprising:

receiving new speed data from the mobile device;

determining, from the new speed data, that the mobile device is moving at a new estimated speed that exceeds the predetermined threshold; and setting an availability status of the mobile device to unavailable based on determining that the mobile device is moving at Hall the new estimated speed.

9. A system comprising one or more computers and one or more storage devices storing instructions that when executed by the one or more computers cause the one or more computers to perform operations comprising:

receiving a first call intended for a mobile device;

determining that the mobile device is located in a predetermined geographic location;

determining that the mobile device is stationary, including:

determining an estimated speed for the mobile device, determining that the estimated speed for the mobile device does not exceed a predetermined speed threshold, and in response to determining that the estimated speed for the mobile device does not exceed the predetermined speed threshold, determining that the mobile device is stationary; and in response to determining that the mobile device is located in the predetermined geographic location and determining that the mobile device is stationary, routing the first call intended for the mobile device to another device based on the mobile device being stationary and in the predetermined geographic location.

10. The system of claim 9, wherein determining that the mobile device is located in the predetermined geographic location comprises:

receiving geographic information from the mobile device; and determining from the geographic location that the mobile device is located in the predetermined geographic location.

11. The system of claim 10, the operations further comprising:

providing location instructions to the mobile device that, when executed by the mobile device, cause the mobile device to transmit the geographic information to the system in response to determining that the mobile device has entered the predetermined geographic location.

12. The system of claim 9, the operations further comprising:

generating a call-related action rule that defines a call-related action that specifies that, when the mobile device is in the predetermined geographic location calls and the mobile device is stationary, calls intended for the mobile device should be routed to the other device; and wherein routing the first call intended for the mobile device to the other device comprises applying the call-related action to the first call based on determining that the mobile device is stationary and in the predetermined geographic location.

13. The system of claim 12, wherein generating the call-related action rule comprises:

providing, for presentation on the mobile device, a user interface for configuring call-related action rules;

receiving rule data from the mobile device; and generating the call-related action rule based on the rule data received from the mobile device.

14. The system of claim 13, wherein receiving rule data comprises receiving data defining the predetermined geographic location.

15. The system of claim 9, wherein determining that the mobile device is stationary comprises:

receiving data identifying a moving speed of the mobile device from the mobile device; and determining the estimated speed of the mobile device based on the data.

16. The system of claim 15, the operations further comprising:

receiving new speed data from the mobile device;

determining, from the new speed data, that the mobile device is moving at a new estimated speed that exceeds the predetermined threshold; and setting an availability status of the mobile device to unavailable based on determining that the mobile device is moving at the new estimated speed.

17. One or more non-transitory computer storage media encoded with a computer program product, the computer program product comprising instructions that when executed by one or more computers cause the one or more computers to perform operations comprising:

receiving a first call intended for a mobile device;

determining that the mobile device is located in a predetermined geographic location;

determining that the mobile device is stationary, including:

determining an estimated speed for the mobile device, determining that the estimated speed for the mobile device does not exceed a predetermined speed threshold, and in response to determining that the estimated speed for the mobile device does not exceed the predetermined speed threshold, determining that the mobile device is stationary; and in response to determining that the mobile device is located in the predetermined geographic location and determining that the mobile device is stationary, routing the first call intended for the mobile device to another device based on the mobile device being stationary and in the predetermined geographic location.

18. The computer storage media of claim 17, wherein determining that the mobile device is located in the predetermined geographic location comprises:

receiving geographic information from the mobile device; and determining from the geographic location that the mobile device is located in the predetermined geographic location.

19. The computer storage media of claim 18, the operations further comprising:

providing location instructions to the mobile device that, when executed by the mobile device, cause the mobile device to transmit the geographic information to the one or more computers in response to determining that the mobile device has entered the predetermined geographic location.

20. The computer storage media of claim 17, the operations further comprising:

generating a call-related action rule that defines a call-related action that specifies that, when the mobile device is in the predetermined geographic location calls and the mobile device is stationary, calls intended for the mobile device should be routed to the other device; and wherein routing the first call intended for the mobile device to the other device comprises applying the call-related action to the first call based on determining that the mobile device is stationary and in the predetermined geographic location.

* * * * *

UNITED STATES PATENT AND TRADEMARK OFFICE
CERTIFICATE OF CORRECTION

PATENT NO. : 9,736,756 B2  
APPLICATION NO. : 14/986410  
DATED : August 15, 2017  
INVENTOR(S) : Vlad Vendrow et al.

Page 1 of 1

It is certified that error appears in the above-identified patent and that said Letters Patent is hereby corrected as shown below:

On the Title Page

Page 2, Column 1 (Related U.S. Application Data), Line 5: delete "14/988,410," and insert --14/986,410,--, therefor.

In the Claims

Column 21, Line 51, in Claim 7: after "device" delete "from the mobile device".

Column 21, Line 60, in Claim 8: after "at" delete "Hall".

Column 22, Line 62, in Claim 15: after "device" delete "from the mobile device".

Signed and Sealed this  
Eighth Day of May, 2018

Andrei Iancu  
*Director of the United States Patent and Trademark Office*